US012709535B2

(12) United States Patent
Park et al.

(10) Patent No.: US 12,709,535 B2
(45) Date of Patent: Aug. 18, 2026

(54) DISPENSER FASTENING DEVICE

(71) Applicant: SAMSUNG ELECTRONICS CO., LTD., Suwon-si (KR)

(72) Inventors: Shi Baek Park, Suwon-si (KR); Han-Sung Kim, Changwon-si (KR); Gi-Seong Kim, Changwon-si (KR); Sung-Hun Jeong, Changwon-si (KR)

(73) Assignees: Samsung Electronics Co., Ltd., Suwon-Si (KR); Industry-Academic Cooperation Foundation of Kyungnam University, Changwon-Si (KR)

( * ) Notice: Subject to any disclaimer, the term of this patent is extended or adjusted under 35 U.S.C. 154(b) by 151 days.

(21) Appl. No.: 18/646,920

(22) Filed: Apr. 26, 2024

(65) Prior Publication Data

US 2025/0115470 A1 Apr. 10, 2025

(30) Foreign Application Priority Data

Oct. 10, 2023 (KR) ........................ 10-2023-0134332

(51) Int. Cl.
*B67D 7/02* (2010.01)

(52) U.S. Cl.
CPC .................................. *B67D 7/0288* (2013.01)

(58) Field of Classification Search
CPC . B67D 7/0288; B25J 15/0028; B25J 15/0266; B25J 15/0009; B25J 15/08;
(Continued)

(56) References Cited

U.S. PATENT DOCUMENTS 3,759,563 A * 9/1973 Kitamura ................. B25J 9/041
901/29
3,835,617 A * 9/1974 Stock ...................... G21F 7/065
53/111 R
(Continued)

FOREIGN PATENT DOCUMENTS

KR 10-2016-0021372 2/2016
KR 10-1642640 7/2016
(Continued)

OTHER PUBLICATIONS

Kim et al., "BLT Gripper: An Adaptive Gripper With Active Transition Capability Between Precise Pinch and Compliant Grasp," IEEE Robotics and Automation Letters, Jul. 9, 2020, 5(4):5518-5525.

*Primary Examiner* — Dariush Seif
(74) *Attorney, Agent, or Firm* — Fish & Richardson P.C.

(57) ABSTRACT

There is provided a dispenser fastening device that automatically fastens a dispenser to a container. The dispenser fastening device comprises a columnar housing, a link unit, a plate connected to the link unit, a side wall of the plate having a recessed shape, a finger tip spaced apart from the plate, a side wall of the finger tip having a recessed shape recessed, a finger base connecting the plate and the finger tip and installed on a first surface of the plate, a first adjusting pulley, a second adjusting pulley, and a driving pulley provided on a second surface opposite to the first surface of the plate, and a belt surrounding the first adjusting pulley, the second adjusting pulley, and the driving pulley, wherein a center of the first adjusting pulley, a center of the second adjusting pulley, and a center of the driving pulley form a triangle.

6 Claims, 25 Drawing Sheets

(58) Field of Classification Search
CPC .. B25J 15/022; B25J 15/0206; B25J 15/0253; B25J 15/0475; B25J 15/005; B25J 15/0019
See application file for complete search history.

(56) References Cited

U.S. PATENT DOCUMENTS

| | | | | | |
|---|---|---|---|---|---|
| 4,368,913 | A * | 1/1983 | Brockmann | B25J 15/0266 | 294/203 |
| 4,494,583 | A * | 1/1985 | Reeves, Jr. | B65B 3/28 | 141/168 |
| 4,600,357 | A * | 7/1986 | Coules | B25J 13/082 | 414/730 |
| 5,056,844 | A * | 10/1991 | Takabayashi | B25J 15/0206 | 294/2 |
| 5,284,375 | A * | 2/1994 | Land, III | E21B 19/14 | 414/22.71 |
| 5,284,998 | A * | 2/1994 | Lima | B65D 77/06 | 405/129.1 |
| 5,423,159 | A * | 6/1995 | Bankuty | B65B 7/2835 | 53/317 |
| 5,516,173 | A * | 5/1996 | Sawdon | B25J 15/0475 | 269/282 |
| 5,588,688 | A * | 12/1996 | Jacobsen | B25J 15/0266 | 294/902 |
| 7,341,295 | B1 * | 3/2008 | Veatch | B25J 15/0206 | 623/64 |
| 7,806,151 | B2 * | 10/2010 | Hennen | B65D 51/1683 | 141/367 |
| 8,096,099 | B2 * | 1/2012 | Krevald | B67B 3/261 | 53/317 |
| 9,694,500 | B1 * | 7/2017 | Ferrier | B25J 13/08 | |
| 9,833,908 | B2 * | 12/2017 | Nagatsuka | B25J 15/0009 | |
| 9,908,219 | B2 * | 3/2018 | Takahashi | B25B 5/087 | |
| 10,435,287 | B2 * | 10/2019 | Lu | B67B 7/182 | |
| 10,486,956 | B2 * | 11/2019 | Ware | B67D 7/0288 | |
| 10,549,431 | B2 * | 2/2020 | Bettaiah | B25B 5/087 | |
| 10,807,744 | B1 * | 10/2020 | Seiver | B67B 7/42 | |
| 11,027,965 | B2 * | 6/2021 | Chen | B67B 7/182 | |
| 11,203,451 | B2 * | 12/2021 | Chen | B67B 7/42 | |
| 11,826,910 | B2 * | 11/2023 | Bhatia | B25J 15/0028 | |
| 11,850,734 | B2 * | 12/2023 | Liu | B25J 15/0206 | |
| 12,356,901 | B2 * | 7/2025 | Ng | A01G 9/128 | |
| 12,370,638 | B2 * | 7/2025 | Kim | B23Q 5/10 | |
| 12,459,138 | B2 * | 11/2025 | Lee | B25J 9/08 | |
| 12,528,203 | B2 * | 1/2026 | Littfin | B25J 15/04 | |
| 12,576,522 | B2 * | 3/2026 | Park | B25J 9/1633 | |
| 2002/0093211 | A1 * | 7/2002 | Filipiak | B25B 5/087 | 294/203 |
| 2004/0089373 | A1 * | 5/2004 | Seiver | B67C 3/30 | 141/270 |
| 2005/0275232 | A1 * | 12/2005 | Horie | B25J 7/00 | 294/86.4 |
| 2006/0243755 | A1 * | 11/2006 | Hennen | B67D 7/0294 | 222/464.1 |
| 2008/0018124 | A1 * | 1/2008 | Waldorf | B25B 5/087 | 294/203 |
| 2008/0181757 | A1 * | 7/2008 | Wheeler | B25J 19/0004 | 414/815 |
| 2008/0217939 | A1 * | 9/2008 | Jenkins | B25J 19/0091 | 294/116 |
| 2010/0096870 | A1 * | 4/2010 | Saadat | B25J 9/104 | 294/198 |
| 2010/0132511 | A1 * | 6/2010 | Sutton | B66C 1/447 | 81/3.4 |
| 2010/0259057 | A1 * | 10/2010 | Madhani | B25J 9/1045 | 901/31 |
| 2011/0067628 | A1 * | 3/2011 | Savoie | B29D 11/00423 | 118/500 |
| 2011/0115244 | A1 * | 5/2011 | Kamon | B25J 15/0266 | 294/106 |
| 2011/0148132 | A1 * | 6/2011 | Park | B25J 15/10 | 294/106 |
| 2015/0298960 | A1 * | 10/2015 | Hennen | B67D 7/0288 | 29/428 |
| 2018/0244416 | A1 * | 8/2018 | Canalini | B29C 66/24221 | |
| 2018/0264660 | A1 * | 9/2018 | Bergeron | B25J 9/1607 | |
| 2018/0272543 | A1 * | 9/2018 | Kayama | B25J 9/1687 | |
| 2018/0282001 | A1 * | 10/2018 | Canalini | B65B 59/003 | |
| 2019/0366564 | A1 * | 12/2019 | Guerin | B25J 15/0433 | |
| 2021/0129355 | A1 * | 5/2021 | Son | B25J 15/0033 | |
| 2021/0299887 | A1 * | 9/2021 | Lindner | B25J 15/0042 | |
| 2022/0305675 | A1 * | 9/2022 | An | B25J 15/08 | |
| 2023/0065554 | A1 * | 3/2023 | Kim | B25J 15/0475 | |
| 2023/0184235 | A1 * | 6/2023 | Theisen | F04B 9/047 | 417/415 |
| 2023/0211510 | A1 * | 7/2023 | Casaulta | B23Q 7/048 | 294/119.1 |
| 2023/0234823 | A1 * | 7/2023 | Coscia | B65D 47/248 | |
| 2023/0373103 | A1 * | 11/2023 | Littfin | B25J 15/04 | |
| 2024/0100690 | A1 * | 3/2024 | Kim | B25J 9/102 | |
| 2024/0114855 | A1 * | 4/2024 | Ng | B25J 13/00 | |
| 2024/0308069 | A1 * | 9/2024 | Park | B25J 9/1633 | |
| 2024/0351220 | A1 * | 10/2024 | Kim | B25J 9/1045 | |
| 2024/0375269 | A1 * | 11/2024 | Kim | B25J 5/007 | |
| 2025/0073922 | A1 * | 3/2025 | Maffeis | B25J 19/0041 | |
| 2025/0115470 | A1 * | 4/2025 | Park | B67D 7/0288 | |
| 2025/0296246 | A1 * | 9/2025 | Shannon | B25J 15/0009 | |

FOREIGN PATENT DOCUMENTS

| | | |
|---|---|---|
| KR | 10-2017-0017956 | 2/2017 |
| KR | 10-2017-0017957 | 2/2017 |
| KR | 10-2092609 | 3/2020 |
| KR | 2021-0061237 | 5/2021 |
| KR | 10-2022-0113121 | 8/2022 |

* cited by examiner

DISPENSER FASTENING DEVICE

CROSS-REFERENCE TO RELATED APPLICATION

This application claims priority to Korean Patent Application No. 10-2023-0134332 filed on Oct. 10, 2023, the disclosure of which is incorporated herein by reference in its entirety.

TECHNICAL FIELD

The present disclosure relates to a dispenser fastening device.

BACKGROUND

Chemicals can be stored in specific containers. In many cases, specialized dispensers are used to fill or discharge chemicals from the containers. A worker may manually perform a task of coupling the dispenser to the container. In this case, the worker may be exposed to safety risks due to the chemicals in the container.

SUMMARY

Example aspects of the present disclosure provide a dispenser fastening device that automatically fastens a dispenser to a container.

In general, an aspect of the subject matter described in this specification is a dispenser fastening device comprising: a columnar housing, a link unit which is connected to the housing and extends in a first direction, a plate which is connected to the link unit, a side wall of the plate having a shape recessed in a second direction intersecting the first direction, a finger tip which is spaced apart from the plate in a third direction intersecting the first direction and the second direction, a side wall of the finger tip having a shape recessed in the second direction, a finger base which connects the plate and the finger tip, and is installed on a first surface of the plate, a first adjusting pulley, a second adjusting pulley, and a driving pulley which are provided on a second surface opposite to the first surface of the plate in the third direction, and a belt which surrounds the first adjusting pulley, the second adjusting pulley, and the driving pulley, wherein a figure which connects a center of the first adjusting pulley, a center of the second adjusting pulley, and a center of the driving pulley by a straight line is a triangle.

Another general aspect is a dispenser fastening device comprising: a columnar housing, a link unit driver installed on the housing, a link unit which is connected to the housing, and extends in a first direction, a plate which is connected to the link unit, a side wall of the plate having a shape recessed in a second direction intersecting the first direction, a finger tip which is spaced apart from the plate in a third direction intersecting the first direction and the second direction, a side wall of the finger tip having a shape recessed in the second direction, a finger base which connects the plate and the finger tip, and is installed on a first surface of the plate, an extension part which extends in the first direction, the extension part including a first portion, and a second portion spaced apart from the first portion in the first direction, a rotary gripping link which is spaced apart from the extension part in the second direction, and has a shape recessed in the second direction, the rotary gripping link including a third portion, and a fourth portion spaced apart from the third portion in the third direction, a first horizontal spring which connects the first portion and the third portion, a second horizontal spring which connects the second portion and the fourth portion, a first connecting unit which is disposed between the extension part and the plate, and connects the plate and the extension part, and a second connecting unit which is disposed between the extension part and the plate, connects the plate and the extension part, and is spaced apart from the first connecting unit in the first direction, wherein an arbitrary straight line which connects the first portion and the fourth portion intersects an arbitrary straight line which connects the second portion and the third portion.

Another general aspect is a dispenser fastening device comprising: a columnar housing, a link unit driver installed on the housing, a link unit which is connected to the housing and extends in a first direction, a plate which is connected to the link unit, a side wall of the plate having a shape being recessed in a second direction intersecting the first direction, a finger tip which is spaced apart from the plate in a third direction intersecting the first direction and the second direction, a side wall of the finger tip having a shape recessed in the second direction, and a finger base which connects the plate and the finger tip, and is installed on a first surface of the plate, wherein the link unit includes a gripping link connected to the first surface of the plate, and a driving link connected to the gripping link and the housing.

DETAILED DESCRIPTION

Figure 1:
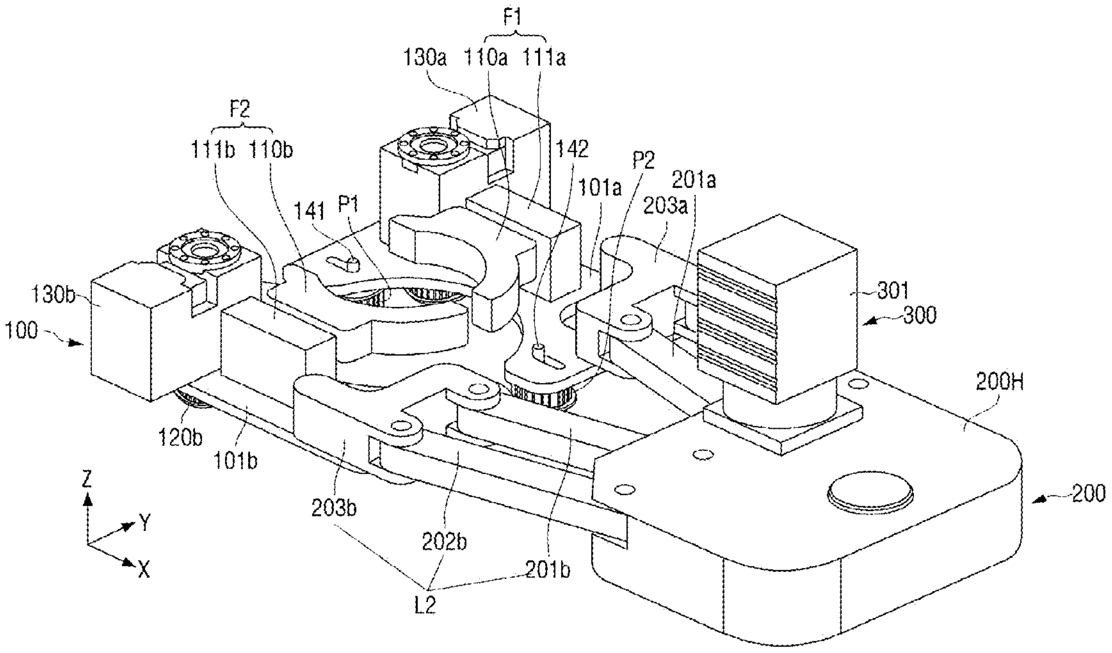
FIG. 1 is a perspective view of an example of a dispenser fastening device.
Figure 2:
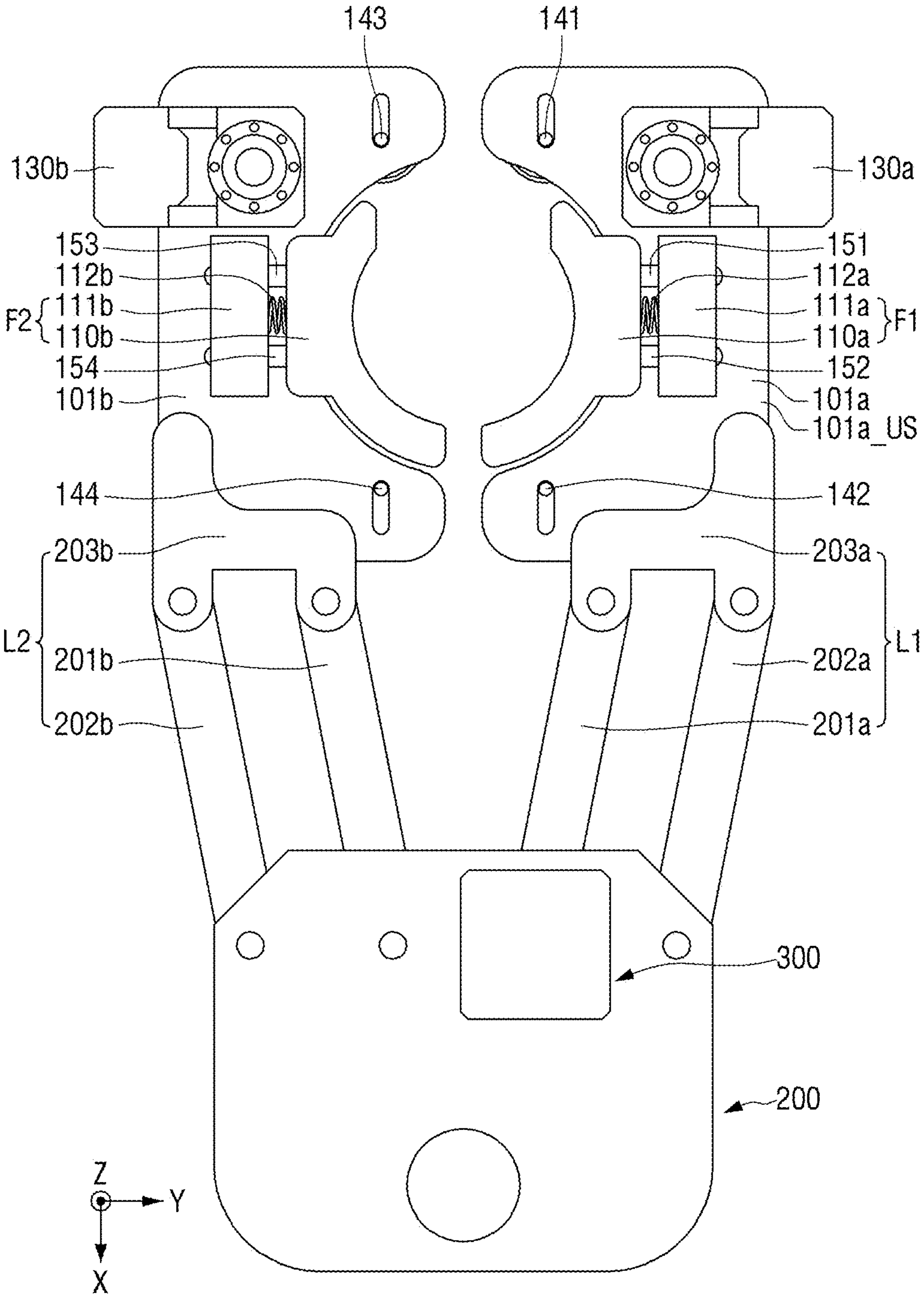
FIG. 2 is a top view of the dispenser fastening device of FIG. 1.
Figure 3:
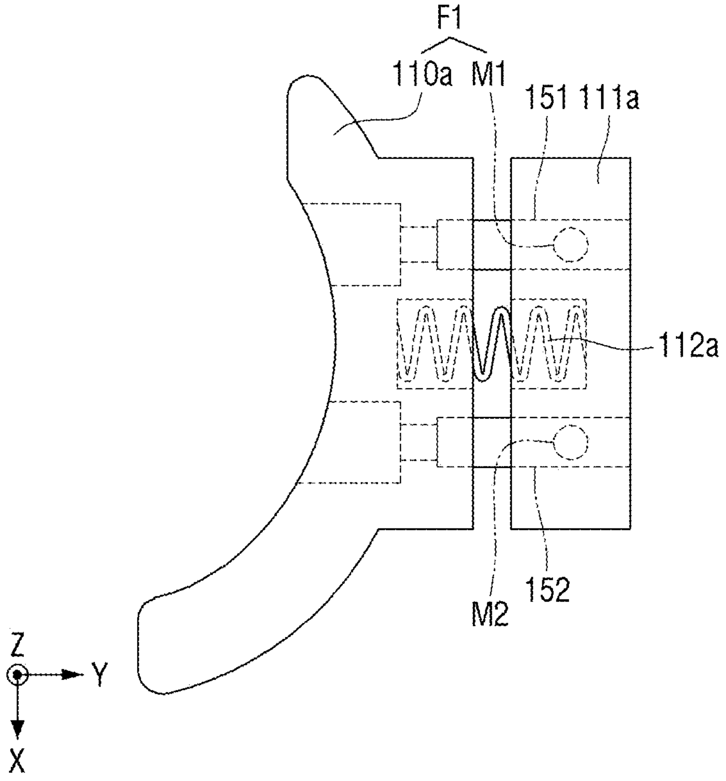
FIG. 3 is a diagram showing a finger unit of the dispenser fastening device of FIG. 1.
Figure 4:
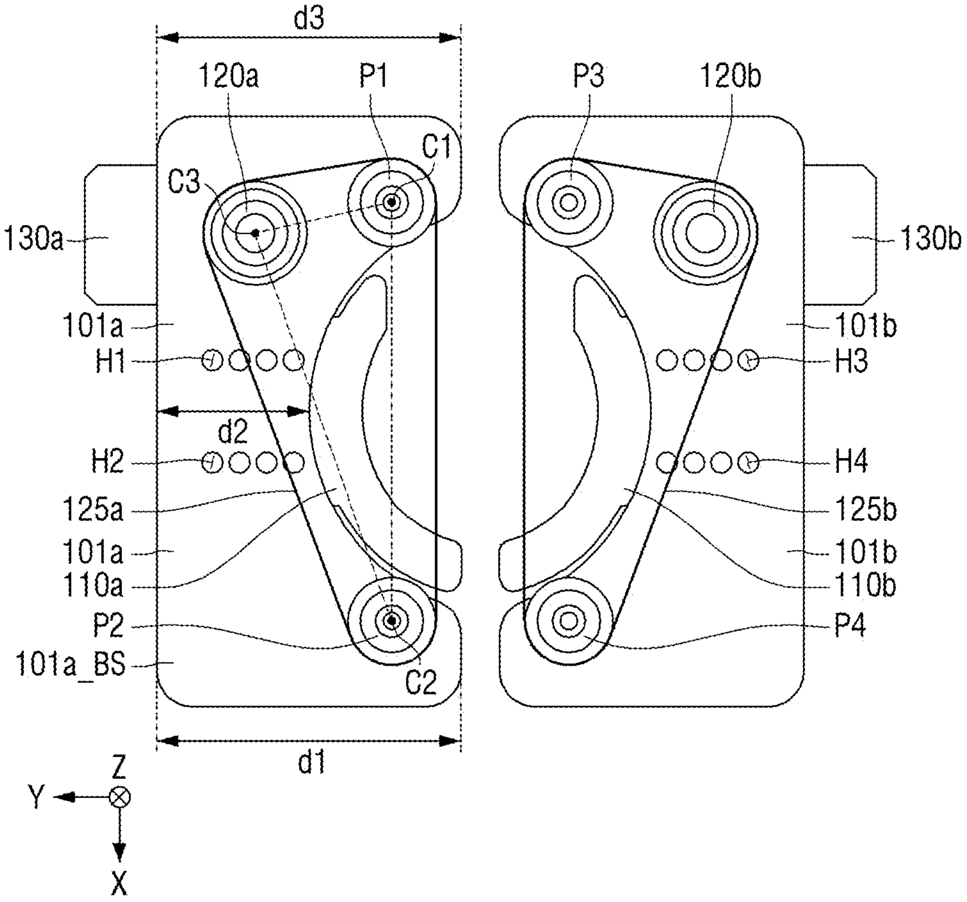
FIG. 4 is a bottom view of a gripping unit of FIG. 1.
Figure 5:
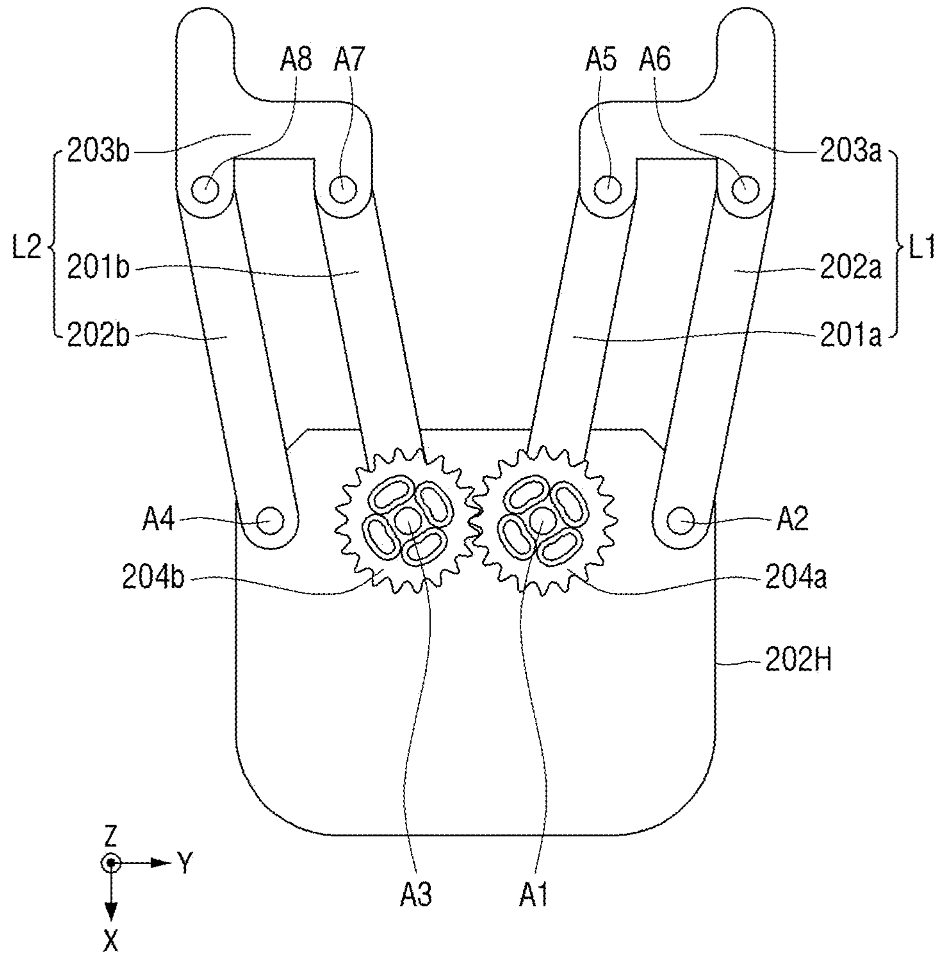
FIG. 5 is a top transparent view of a body unit of FIG. 1.
Figure 6:
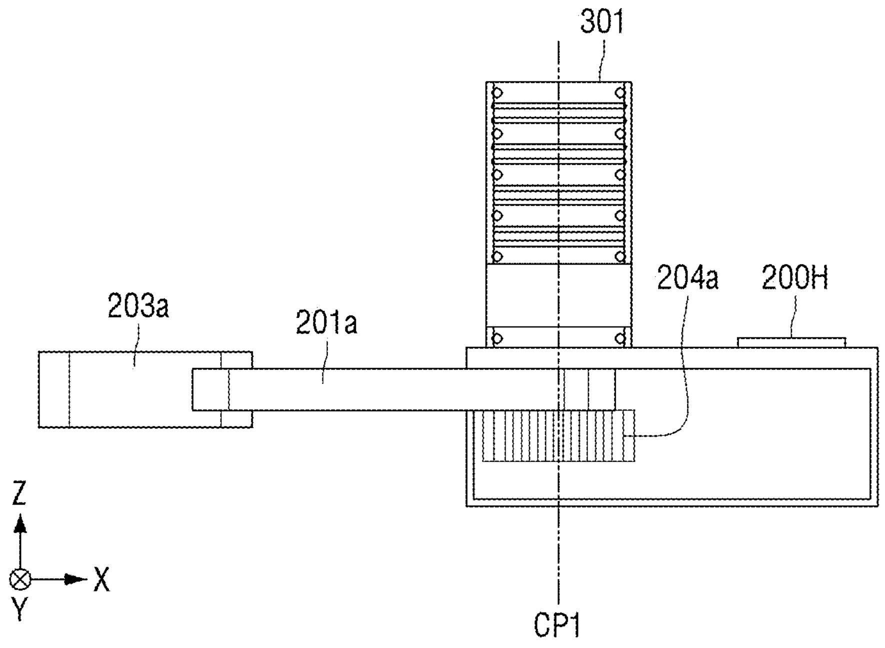
FIG. 6 is a side transparent view of the body unit of FIG. 1.

FIG. 1 is a perspective view of an example of a dispenser fastening device. FIG. 2 is a top view of the dispenser fastening device of FIG. 1. FIG. 3 is a diagram showing a finger unit of the dispenser fastening device of FIG. 1. FIG. 4 is a bottom view of a gripping unit of FIG. 1. FIG. 5 is a top transparent view of a body unit of FIG. 1. FIG. 6 is a side transparent view of the body unit of FIG. 1.

Referring to FIGS. 1 to 6, the dispenser fastening device includes a gripping unit 100, a body unit 200, and a power unit 300.

The gripping unit 100 may include a first plate 101*a*, a first finger unit F1, a first pulley driver 130*a*, a first driving pulley 120*a*, a first adjusting pulley P1, a second adjusting pulley P2, a first belt 125*a*, a first tension adjuster 141, a second tension adjuster 142, a second plate 101*b*, a second finger unit F2, a second pulley driver 130*b*, a second driving pulley 120*b*, a third adjusting pulley P3, a fourth adjusting pulley P4, a second belt 125*b*, a third tension adjuster 143, and a fourth tension adjuster 144.

The first plate 101*a* may extend in a first direction X.

The first plate 101*a* may have a "U" shape. More specifically, one side wall of the first plate 101*a* may have a recessed form in a second direction Y that intersects the first direction X. Alternatively, the other side wall of the first plate 101*a* may not be recessed in the second direction Y.

In other words, a length of the first plate 101*a* in the second direction Y may not be constant. In FIG. 3, the length of the first plate 101*a* in the second direction Y in a portion at which the second adjusting pulley P2 is located may be a first length d1. Further, the length of the first plate 101*a* in the second direction Y in a portion at which the first adjusting pulley P1 is located may be a third length d3. Further, the length of the first plate 101*a* in the second direction Y between the portion at which the first adjusting pulley P1 is located and the second adjusting pulley P2 may be a second length d2. At this time, a dimension of the first length d1 may be larger than that of the second length d2. Further, a dimension of the third length d3 may be larger than that of the second length d2.

The first plate 101*a* may include a first surface 101*a*_US. Further, the first plate 101*a* may include a second surface 101*a*_BS that is spaced apart from the first surface 101*a*_US in a third direction Z that intersects the first direction X and the second direction Y.

The first finger unit F1 and the first pulley driver 130*a* may be located on the first surface 101*a*_US of the first plate 101*a*.

The first driving pulley 120*a*, the first adjusting pulley P1, and the second adjusting pulley P2 may be disposed on the second surface 101*a*_BS of the first plate 101*a*.

The first plate 101*a* may include a set of a first hole H1 and a second hole H2 spaced apart in the first direction X. Although the first plate 101*a* is shown as having four sets of first holes H1 and second holes H2, the present disclosure is not limited to thereto, e.g., there may be a different number of the sets of first holes H1 and second holes H2.

The first finger base 111*a* may be connected to the first plate 101*a* by a set of the first hole H1 and the second hole H2.

More specifically, the first connecting member M1 is disposed in the first hole H1, and the first finger base 111*a* and the first plate 101*a* may be connected. The second connecting member M2 is disposed in the second hole H2 corresponding to the first hole H1, and the first finger base 111*a* and the first plate 101*a* may be connected.

A position of the first finger base 111*a* may be adjusted by the set of the first hole H1 and the second hole H2. When the position of the first finger base 111*a* is adjusted, one dispenser fastening device can grip dispensers 400 of various sizes.

The first finger unit F1 may be disposed on the first surface 101*a*_US of the first plate 101*a*. The first finger unit F1 may overlap a center portion of the first plate 101*a* but is not limited thereto, e.g., the center portion of the first plate 101*a* can be non-overlapping with the first finger unit F1. A length of the center portion of the first plate 101*a* in the second direction Y may be a second length d2.

The first finger unit F1 may include a first finger base 111*a* and a first finger tip 110*a*.

The first finger base 111*a* may be connected to the first surface 101*a*_US of the first plate 101*a*. The first finger base 111*a* may extend from the first surface 101*a*_US of the first plate 101*a*. Although the first finger base 111*a* is shown in the form of a rectangular parallelepiped, the shape is not limited thereto.

As described above, the first finger base 111*a* may be connected to the first plate 101*a* through the first connecting member M1 and the second connecting member M2. For example, the first connecting member M1 and the second connecting member M2 may be screws but are not limited thereto.

The first finger tip 110*a* may be disposed on a side wall of the first finger base 111*a*. The first finger tip 110*a* may be connected to the side wall of the first finger base 111*a*.

In some implementations, the first finger tip 110*a* may be connected to the first finger base 111*a*, using a first joint 151 and a second joint 152. The first joint 151 and the second joint 152 may extend in the second direction Y. The first joint 151 and the second joint 152 may pass through one side wall of the first finger tip 110*a* and one side wall of the first finger base 111*a* that faces the one side wall of the first finger tip 110*a*.

The first finger tip 110*a* may have a "U-shape." More specifically, one side wall of the first finger tip 110*a* may have a shape recessed in the second direction Y. Alternatively, the other side wall of the first finger tip 110*a* may not be recessed in the second direction Y.

A first spring 112*a* may be interposed between the first finger tip 110*a* and the first finger base 111*a*.

The first spring 112*a* may have an elastic force. Therefore, even if there are some errors in the size of the dispenser 400, the finger units F1 and F2 may grip the dispenser 400. When the finger units F1 and F2 grip the dispenser 400, the first spring 112*a* may be compressed.

The first pulley driver 130*a* may be disposed on the first surface 101*a*_US of the first plate 101*a*. The first pulley driver 130*a* may be spaced apart from the first finger base 111*a* in the first direction X.

The first driving pulley 120*a* may be operated by the first pulley driver 130*a*. The first pulley driver 130*a* may include a power supply. The electrical energy provided by the first pulley driver 130*a* may be converted into a rotational energy of the first driving pulley 120*a*.

More specifically, the first driving pulley 120*a* may rotate about a center C3 of the first driving pulley 120*a*. The first driving pulley 120*a* may rotate counterclockwise or clockwise.

The first driving pulley 120*a* may be disposed on the second surface 101*a*_BS of the first plate 101*a*. The first driving pulley 120*a* may contact the second surface 101*a*_BS of the first plate 101*a*.

The first driving pulley 120*a* may be connected to the first pulley driver 130*a*.

At least a part of the periphery of the first driving pulley 120*a* may be surrounded by the first belt 125*a*.

The first driving pulley 120*a* may include a constituent material having a high coefficient of friction. A frictional force may exist between the first driving pulley 120*a* and the first belt 125*a*. Therefore, when the first driving pulley 120*a* rotates around the center of the first driving pulley 120*a*, the first belt 125*a* may rotate around the first driving pulley 120*a*.

The first adjusting pulley P1 may be disposed on the second surface 101*a*_BS of the first plate 101*a*. The first adjusting pulley P1 may be spaced apart from the first driving pulley 120*a* in the first direction X. The first adjusting pulley P1 may be spaced apart from the first driving pulley 120*a* in the second direction Y.

At least a part of the periphery of the first adjusting pulley P1 may be surrounded by the first belt 125*a*.

The second adjusting pulley P2 may be disposed on the second surface 101*a*_BS of the first plate 101*a*. The second adjusting pulley P2 may be spaced apart from the first driving pulley 120*a* in the first direction X. The second adjusting pulley P2 may be spaced apart from the first driving pulley 120*a* in the second direction Y.

At least a part of the periphery of the second adjusting pulley P2 may be surrounded by the first belt 125*a*.

The first adjusting pulley P1 and the second adjusting pulley P2 may be spaced apart from each other in the first direction X.

The first belt 125*a* may be disposed on the second surface 101*a*_BS of the first plate 101*a*.

The first belt 125*a* may surround at least a part of the first driving pulley 120*a*, the first adjusting pulley P1, and the second adjusting pulley P2. The first belt 125*a* may move along the periphery of the first driving pulley 120*a*, the first adjusting pulley P1, and the second adjusting pulley P2.

Since the first belt 125*a* may have elastic force, the length of the first belt 125*a* may extend in the state of being in contact with the first driving pulley 120*a*, the first adjusting pulley P1, and the second adjusting pulley P2. In this case, the elastic force of the first belt 125*a* may increase.

The first tension adjuster 141 may penetrate the first plate 101*a* in the third direction Z. The first tension adjuster 141 may be movable in the first direction X within a certain range. The first tension adjuster 141 may be connected to the first adjusting pulley P1.

Depending on the position of the first tension adjuster 141, the length of the first belt 125*a* may increase or decrease. That is, the first tension adjuster 141 may adjust the tension of the first belt 125*a*.

The second tension adjuster 142 may penetrate the first plate 101*a* in the third direction Z. The second tension adjuster 142 may be movable in the first direction X within a certain range. The second tension adjuster 142 may be connected to the second adjusting pulley P2.

Depending on the position of the second tension adjuster 142, the length of the first belt 125*a* may increase or decrease. That is, the second tension adjuster 142 may adjust the tension of the first belt 125*a*.

The center C1 of the first adjusting pulley P1, the center C2 of the second adjusting pulley P2, and the center C3 of the first driving pulley 120*a* may form corners of a triangle.

The center C1 of the first adjusting pulley P1 and the center C2 of the second adjusting pulley P2 may be spaced apart from each other in the first direction X. The center C1 of the first adjusting pulley P1 and the center C3 of the first driving pulley 120*a* may be spaced apart from each other in the first direction X and the second direction Y. The center C2 of the second adjusting pulley P2 and the center C3 of the first driving pulley 120*a* may be spaced apart from each other in the first direction X and the second direction Y.

In some implementations, a line segment which connects the center C1 of the first adjusting pulley P1 and the center C2 of the second adjusting pulley P2 may resemble an incline, e.g., increasing in height along the first direction X as the position in second direction Y varies.

In some implementations, a line segment which connects the center C1 of the first adjusting pulley P1 and the center C3 of the first driving pulley 120*a*, and a line segment which connects the center C2 of the second adjusting pulley P2 and the center C3 of the first driving pulley 120*a* may form an acute angle.

In some implementations, the length of the line segment which connects the center C1 of the first adjusting pulley P1 and the center C3 of the first driving pulley 120*a* may be smaller than the length of the line segment which connects the center C2 of the second adjusting pulley P2 and the center C3 of the first driving pulley 120*a*.

The description of the second plate 101*b* may be substantially the same as the description of the first plate 101*a*. The description of the second finger unit F2 may be substantially the same as the description of the first finger unit F1. The description of the second pulley driver 130*b* may be substantially the same as the description of the first pulley driver 130*a*. The description of the second driving pulley 120*b* may be substantially the same as the description of the first driving pulley 120*a*. The description of the third adjusting pulley P3 may be substantially the same as the description of the first adjusting pulley P1. The description of the fourth adjusting pulley P4 may be substantially the same as the description of the third adjusting pulley P3. The description of the second belt 125*b* may be substantially the same as the description of the first belt 125*a*. The description of the first tension adjuster 141 may be substantially the same as the description of the third tension adjuster 143. The description of the second tension adjuster 142 may be substantially the same as the description of the fourth tension adjuster 144. The description of the third joint 153 and the fourth joint 154 may be substantially the same as the description of the first joint 151 and the second joint 152. The description of the third hole H3 and the fourth hole H4 may be substantially the same as the description of the first hole H1 and the second hole H2.

The first plate 101*a* and the second plate 101*b* may be spaced apart from each other in the second direction Y. The first finger unit F1 and the second finger unit F2 may be spaced apart from each other in the second direction Y. The first pulley driver 130*a* and the second pulley driver 130*b* may be spaced apart from each other in the second direction Y. The first driving pulley 120*a* and the second driving pulley 120*b* may be spaced apart from each other in the second direction Y. The first adjusting pulley P1 and the third adjusting pulley P3 may be spaced apart from each other in the second direction Y. The second adjusting pulley P2 and the fourth adjusting pulley P4 may be spaced apart from each other in the second direction Y. The first belt 125*a* and the second belt 125*b* may be spaced apart from each other in the second direction Y. The first tension adjuster 141 may be spaced apart from the third tension adjuster 143 in the second direction Y. The second tension adjuster 142 and the fourth tension adjuster 144 may be spaced apart from each other in the second direction Y.

In FIGS. 1, 2, and 4, the gripping unit 100 is shown symmetrically on the basis of an X-Z plane between the first plate 101*a* and the second plate 101*b*, but the implementations are not limited thereto.

A body unit 200 may include a housing 200H, a first link unit L1, and a second link unit L2.

The housing 200H may have a columnar shape. The housing 200H may extend in the first direction X and the second direction Y. The housing 200H may have a thickness in the third direction Z.

For example, although the housing 200H may be a column having an upper surface and a lower surface including rounded edges, but implementations are not limited thereto.

The first link unit L1 may include a first driving link 201*a*, a first auxiliary link 202*a*, a first gripping link 203*a*, and a first gear 204*a*.

A point on which the first driving link 201*a* and the housing 200H are connected is referred to as A1. A point on which the first auxiliary link 202*a* and the housing 200H are connected is referred to as A2.

The first driving link 201*a* may extend from the side wall of the housing 200H in the first direction X. The first driving link 201*a* may be connected to the housing 200H. One side wall of the housing 200H may be recessed by the first driving link 201*a*.

The first auxiliary link 202*a* may extend from the side wall of the housing 200H in the first direction X. The first auxiliary link 202*a* may be connected to the housing 200H. One side wall of the housing 200H may be recessed by the first auxiliary link 202*a*.

The first driving link 201*a* and the first auxiliary link 202*a* may be spaced apart from each other in the second direction Y.

The first gripping link 203*a* may be connected to the first surface 101*a*_US of the first plate 101*a*. More specifically, the lower surface of the first gripping link 203*a* and the first surface 101*a*_US of the first plate 101*a* may contact each other.

In some examples, the upper surface of the dispenser fastening device in this specification is the surface shown in FIG. 2. The lower surface of the dispenser fastening device can be a surface of the dispenser fastening device that is spaced apart from the upper surface of the dispenser fastening device in the third direction Z. For example, a link unit driver 301 may be disposed on the upper surface of the housing 200H.

One side wall of the first gripping link 203*a* may be recessed by the first driving link 201*a*. The first gripping link 203*a* may be connected to the first driving link 201*a* at A1.

The other side wall of the first gripping link 203*a* may be recessed by the first auxiliary link 202*a*. The first gripping link 203*a* may be connected to the first auxiliary link 202*a* at A2.

The first gripping link 203*a* may be fixed on the first surface 101*a*_US of the first plate 101*a*.

In some implementations, the first gripping link 203*a* may have a lowercase "h-shape". That is, the first gripping link 203*a* may include three protruding portions, where two of the protruding portions form a continuous line. The three protruding parts may include a point on which the first driving link 201*a* and the first gripping link 203*a* are connected (identical to A5 to be described below), a point on which the first auxiliary link 202*a* and the first gripping link 203*a* are connected (identical to A6 to be described below), and a point on which the first gripping link 203*a* and the first plate 101*a* are connected.

The first gear 204*a* may be disposed on the top of the first driving link 201*a*. The lower surface of the first gear 204*a* may contact the upper surface of the first driving link 201*a*.

The first gear 204*a* may rotate around the first driving axis CP1. The first driving axis CP1 may be a virtual axis which passes through the point A1 on which the first driving link 201*a* and the housing 200H are connected and extends in the third direction Z.

The first gear 204*a* may be disposed inside the housing 200H.

The first gear 204*a* may have a circular shape with "teeth."

The first driving link 201*a* may rotate by a link unit driver 301, which will be described below. The first driving link 201*a* may rotate around an axis passing through the point A1 on which the first driving link 201*a* and the housing 200H are connected.

The first driving link 201*a* may be supplied with energy by the link unit driver 301. The electrical energy transferred to the link unit driver 301 may be converted into a rotational energy of the first driving link 201*a*.

When the first driving link 201*a* rotates, the teeth of the first gear 204*a* may rotate in the same direction as the direction in which the first driving link 201*a* rotates.

The energy by which the first driving link 201*a* rotates may be transferred through the first gripping link 203*a*. The first auxiliary link 202*a* may rotate around an axis passing through the point A2 on which the first auxiliary link 202*a* and the housing 200H are connected by the transferred energy. In other words, since the first auxiliary link 202*a* and the first driving link 201*a* are connected to the first gripping link 203*a* interposed between, the first auxiliary link 202*a* may rotate on the basis of the point A2 on which the first auxiliary link 202*a* and the housing 200H are connected.

The teeth of the first gear 204*a* may mesh with the teeth of the second gear 204*b*, and the first driving link 201*a* and the second driving link 201*b* operate correspondingly.

When the first driving link 201*a* and the first auxiliary link 202*a* rotate, the first gripping link 203*a* may move in the second direction Y. The first gripping link 203*a* and the first plate 101*a* may be connected. Therefore, when the first gripping link 203*a* moves in the second direction Y, the first plate 101*a* may also move in the second direction Y.

The point on which the first driving link 201*a* and the first gripping link 203*a* are connected is referred to as A5. The point on which the first auxiliary link 202*a* and the first gripping link 203*a* are connected is referred to as A6.

In some implementations, a distance between A1 and A2 may be the same as a distance between A5 and A6.

In some implementations, the distance between A5 and A6 may remain constant even when the first link unit L1 rotates.

The description of the second driving link 201*b* may be substantially the same as the description of the first driving link 201*a*. The description of the second auxiliary link 202*b* may be substantially the same as the description of the first auxiliary link 202*a*. The description of the second gripping link 203*b* may be substantially the same as the description of the first gripping link 203*a*. The description of second gear 204*b* may be substantially the same as the description of first gear 204*a*.

A point on which the second driving link 201*b* and the housing 200H are connected is referred to as A3. A point on which the second auxiliary link 202*b* and the housing 200H are connected is referred to as A4. A point on which the second driving link 201*b* and the second gripping link 203*b* are connected is referred to as A7. A point on which the second auxiliary link 202*b* and the second gripping link 203*b* are connected is referred to as A8.

The description of A1 may be substantially the same as the description of A3. The description of A2 may be substantially the same as the description of A4. The description of A5 may be substantially the same as the description of A7. The description of A6 may be substantially the same as the description of A8.

In some implementations, the distance between A2 and A4 may be greater than the distance between A1 and A3.

In some implementations, the distance between A5 and A7 may not be constant.

In some implementations, the distance between A6 and A8 may not be constant.

In some implementations, the distance between A1 and A5 may be the same as the distance between A3 and A7.

In some implementations, the distance between A2 and A6 may be the same as the distance between A4 and A8.

In FIGS. 1, 2, and 5, although the body unit 200 is shown symmetrically on either side of an X-Z plane between the first link unit L1 and the second link unit L2, implementations are not limited thereto.

The power unit 300 may include a link unit driver 301.

Although the link unit driver 301 is shown to have a columnar shape, the shape is not limited thereto.

The link unit driver 301 may be connected to the first driving link 201*a*.

The link unit driver 301 may rotate the first driving link 201*a* around A1. Alternatively, the link unit driver 301 may not rotate the second driving link 201*b* around A3.

Even if the link unit driver 301 rotates only the first driving link 201*a*, the first driving link 201*a* and the second driving link 201*b* may rotate correspondingly by the first gear 204*a* and second gear 204*b* described above.

The link unit driver 301 may be disposed on the upper surface of the housing 200H. The link unit driver 301 may contact the upper surface of the housing 200H.

In some implementations, the link unit driver 301 may overlap the first gear 204*a* in the third direction Z. Further, the link unit driver 301 may overlap a part of the first driving link 201*a* in the third direction Z. The link unit driver 301 may not be bisected by a virtual X-Z plane that bisects the housing 200H.

Unlike the shown example, the link unit driver 301 may overlap the second gear 204*b* in the third direction Z, and may overlap a part of the second driving link 201*b* in the third direction Z. In this case, the link unit driver 301 may rotate the second driving link 201*b* around A2.

Figure 7:
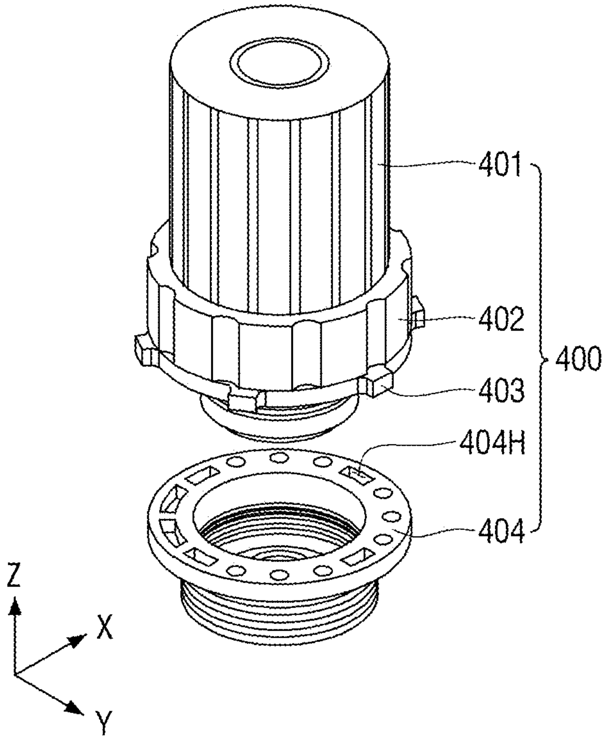
FIG. 7 is a diagram for explaining the configuration of an example of a dispenser.

FIG. 7 is a diagram for explaining the configuration of an example of a dispenser 400.

The dispenser 400 may include a cylinder unit 401, a nut unit 402, a key code 403, a tube hole 404H, and a tube 404.

The cylinder unit 401 may have, but is not limited to, a cylindrical shape.

In some implementations, an outer surface of the cylinder unit 401 may include a recessed groove. The groove may facilitate gripping of the cylinder unit 401 by the dispenser 400 fastening device.

The outer surface herein may be a surface that is far from a center of an object. Alternatively, the inner surface may be a surface that is close to the center of the object. For example, the outer surface of the cylinder unit 401 may contact the inner surface of the nut unit 402.

The cylinder unit 401 may extend in the third direction Z.

The nut unit 402 may be formed to surround at least a part of the cylinder unit 401. The nut unit 402 may have a hollow form. The nut unit 402 may be penetrated by the cylinder unit 401.

The outer surface of the nut unit 402 may include a recessed groove. The groove may facilitate gripping of the nut unit 402 by the dispenser 400 fastening device.

By rotation of the nut unit 402, the cylinder unit 401 may be coupled to or separated apart from the tube 404.

The key code 403 may be formed to surround at least a part of the cylinder unit 401.

The key code 403 may be coupled to a tube hole 404H present on the upper surface of the tube 404. A protruding part corresponding to the shape of the tube hole 404H may be present on the lower surface 403_LS of the key code 403.

The tube 404 may have a hollow cylindrical shape. The tube hole 404H coupled to the protruding part of the key code 403 may be present on the upper surface of the tube 404.

Although not shown, the tube 404 may have a structure that passes through the chemical storage container. When the dispenser 400 is coupled with the chemical storage container, the chemical may move through the tube 404.

Figure 8:
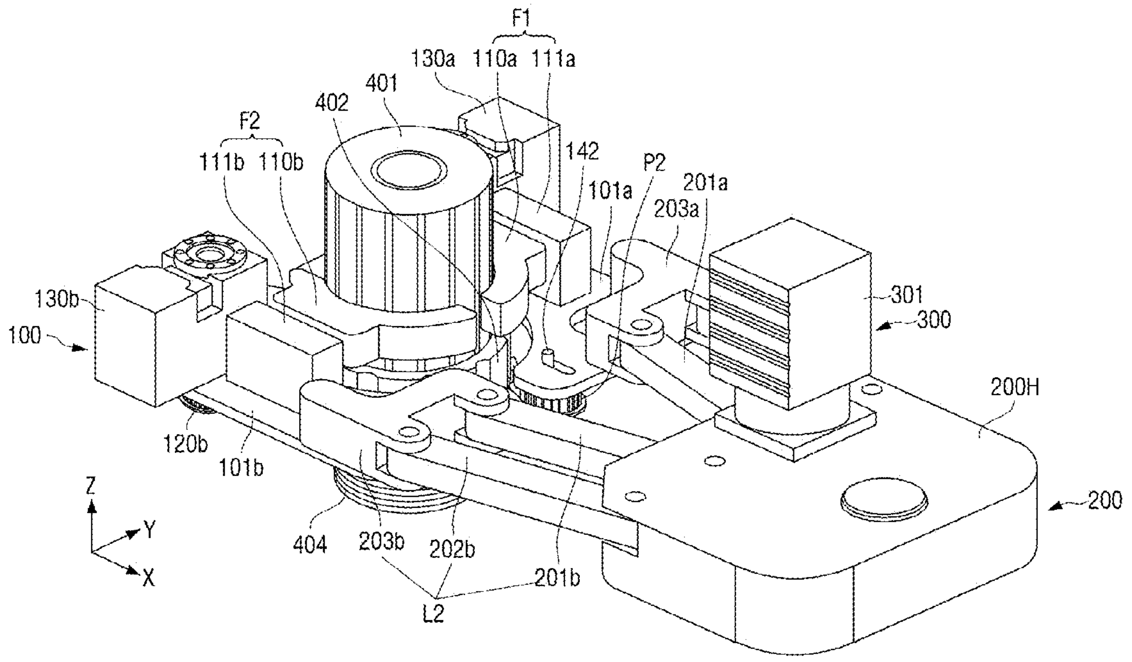
FIG. 8 is an example diagram showing that the dispenser fastening device of FIG. 1 of the present disclosure can be configured to grip a dispenser.

FIG. 8 is an example diagram showing the dispenser 400 fastening device of FIG. 1 of the present disclosure when gripping the dispenser 400.

Referring to FIG. 8, the first finger unit F1 and the second finger unit F2 may grip the cylinder unit 401. More specifically, the first finger tip 110*a* and the second finger tip 110*b* may contact the side walls of the cylinder unit 401.

As described above, the first spring 112*a* and the second spring 112*b* may be interposed between the first finger tip 110*a* and the first finger base 111*a*, and between the second finger tip 110*b* and the second finger base 111*b*, respectively. Since the first spring 112*a* and the second spring 112*b* have elastic force, the first finger tip 110*a* and the second finger tip 110*b* contact with the side wall of the cylinder unit 401 under tensile stress.

The belts 125*an* and 125*b* may contact the key code 403 or the nut unit 402, depending on the position of the side wall of the cylinder unit 401 with which the finger tips 110*a* and 110*b* come into contact.

In some implementations, the height of the finger tips 110*a* and 110*b* when the belts 125*a* and 125*b* contact the key code 403 may be higher than the height of the finger tips 110*a* and 110*b* when the belts 125*a* and 125*b* contact the nut unit 402.

The heights of the finger tips 110*a* and 110*b* may mean a vertical distance from the upper surface 403_US of the key code 403 to the upper surfaces of the finger tip.

Figure 9:
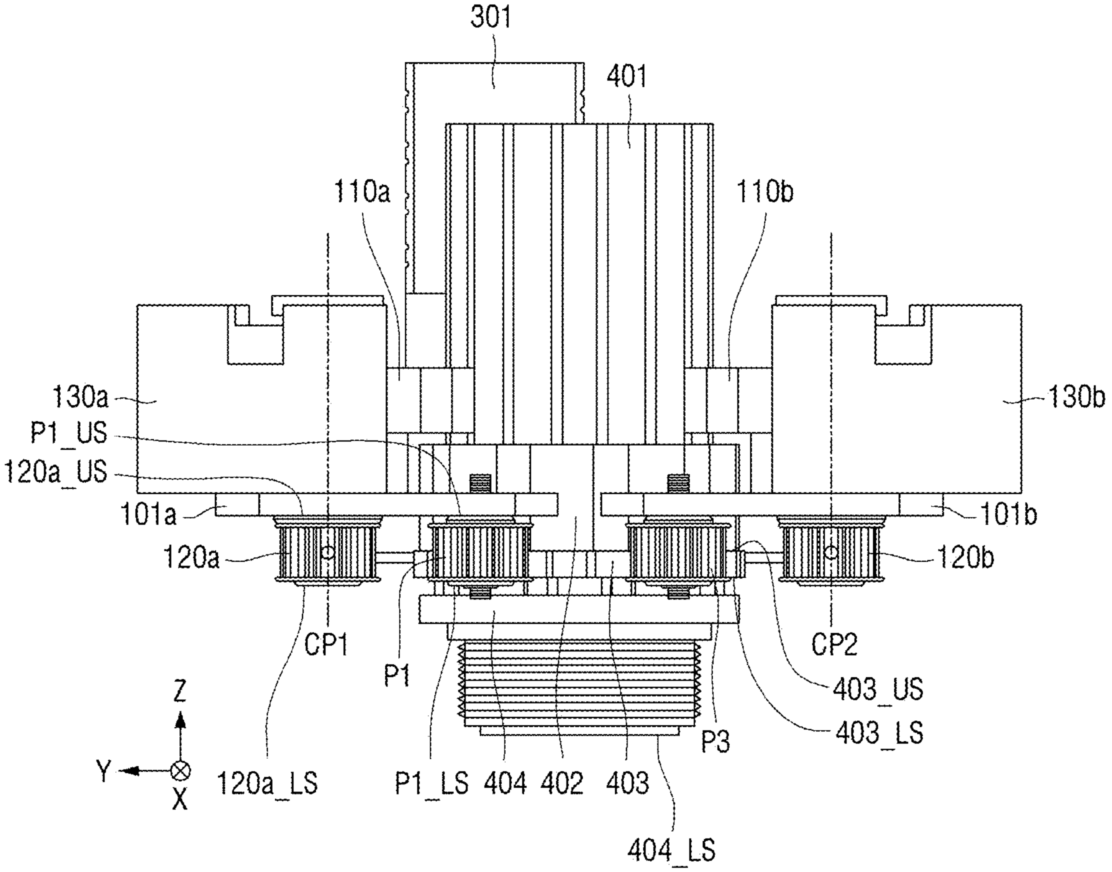
FIG. 9 is a front view showing that the dispenser fastening device of FIG. 1 can be configured to grip a key code.

FIG. 9 is a front view showing the dispenser 400 fastening device of FIG. 1 when gripping the key code 403. Although the first belt 125*a* and the second belt 125*b* are omitted for clarity in FIG. 9, the description will be made on the assumption that the first belt 125*a* and the second belt 125*b* exist in FIG. 9.

Referring to FIG. 9, the heights of the lower surface 120*a*_LS of the first driving pulley 120*a* and the lower surface P1_LS of the first adjusting pulley P1 may be smaller than the height of the lower surface 403_LS of the key code 403 relative to the lower surface 404_LS of the tube 404. The heights of the upper surface 120*a*_US of the first driving pulley 120*a* and the upper surface P1_US of the first adjusting pulley P1 may be greater than the height of the upper surface 403_US of the key code 403 relative to the lower surface 404_LS of the tube 404. Assuming that there is a first belt 125*a* that surrounds the first driving pulley

120*a*, the first adjusting pulley P1, and the second adjusting pulley P2, the first belt 125*a* may contact the side wall of the key code 403.

A positional relationship between the first driving pulley 120*a*, the first adjusting pulley P1, and the key code 403 is substantially the same as a positional relationship between the second driving pulley 120*b*, the third adjusting pulley P3, and the key code 403.

The first driving pulley 120*a* may rotate about the center of the first driving pulley 120*a*. In other words, the first driving pulley 120*a* may rotate around the first driving axis CP1, which is a line passing through the center of the first pulley and extending in the third direction Z.

The second driving pulley 120*b* may rotate about the center of the second driving pulley 120*b*. In other words, the second driving pulley 120*b* may rotate around the second driving axis CP2, which is a line passing through the center of the second pulley and extending in the third direction Z.

When the first driving pulley 120*a* and the second driving pulley 120*b* rotate, the first belt 125*a* and the second belt 125*b* may rotate. The first belt 125*a* and the second belt 125*b* may have a frictional force with the key code 403. Therefore, when the first driving pulley 120*a* and the second driving pulley 120*b* rotate, the key code 403 may rotate.

Figure 10:
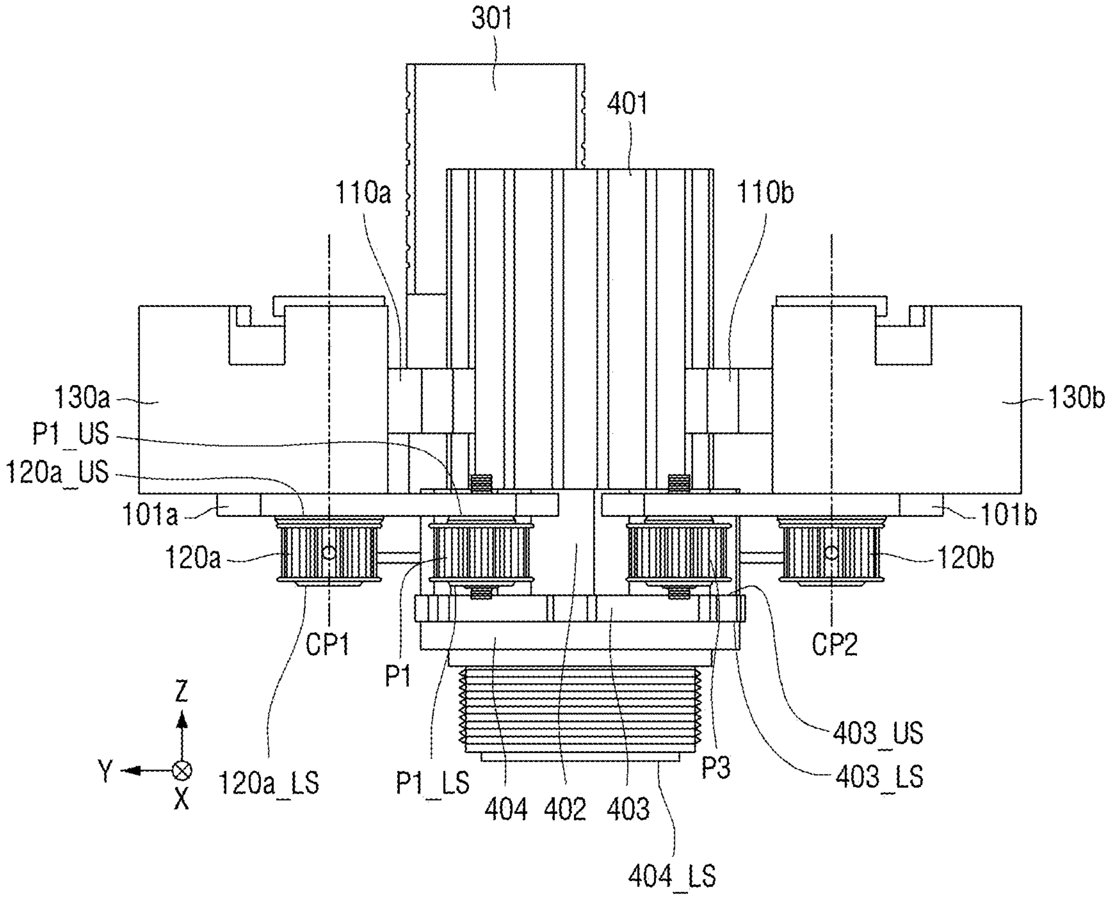
FIG. 10 is a front view showing that the dispenser fastening device of FIG. 1 can be configured to grip the nut unit.

FIG. 10 is a front view showing the dispenser fastening device of FIG. 1 when gripping the nut unit 402. Although the first belt 125*a* and the second belt 125*b* are omitted for clarity in FIG. 10, the description will be made on the assumption that the first belt 125*a* and the second belt 125*b* exist in FIG. 10.

Referring to FIG. 10, the heights of the lower surface 120*a*_LS of the first driving pulley 120*a* and the lower surface P1_LS of the first adjusting pulley P1 may be greater than the height of the upper surface 403_US of the key code 403 relative to the lower surface 404_LS of the tube 404. The heights of the upper surface 120*a*_US of the first driving pulley 120*a* and the upper surface P1_US of the first adjusting pulley P1 may be greater than the height of the upper surface 403_US of the key code 403 relative to the lower surface 404_LS of the tube 404. Assuming that there is a first belt 125*a* that surrounds the first driving pulley 120*a*, the first adjusting pulley P1, and the second adjusting pulley P2, the first belt 125*a* may contact the nut unit 402.

A positional relationship between the first driving pulley 120*a*, the first adjusting pulley P1, and the key code 403 may be substantially the same as a positional relationship between the second driving pulley 120*b*, the third adjusting pulley P3, and the key code 403.

The first driving pulley 120*a* may rotate about the center of the first driving pulley 120*a*. In other words, the first driving pulley 120*a* may rotate around the first driving axis CP1, which is a line passing through the center of the first pulley and extending in the third direction Z.

The second driving pulley 120*b* may rotate about the center of the second driving pulley 120*b*. In other words, the second driving pulley 120*b* may rotate around the second driving axis CP2, which is a line passing through the center of the second pulley and extending in the third direction Z.

When the first driving pulley 120*a* and the second driving pulley 120*b* rotate, the first belt 125*a* and the second belt 125*b* may rotate. The first belt 125*a* and the second belt 125*b* may have a frictional force with the nut unit 402. Therefore, when the first driving pulley 120*a* and the second driving pulley 120*b* rotate, the nut unit 402 may rotate.

Figure 11:
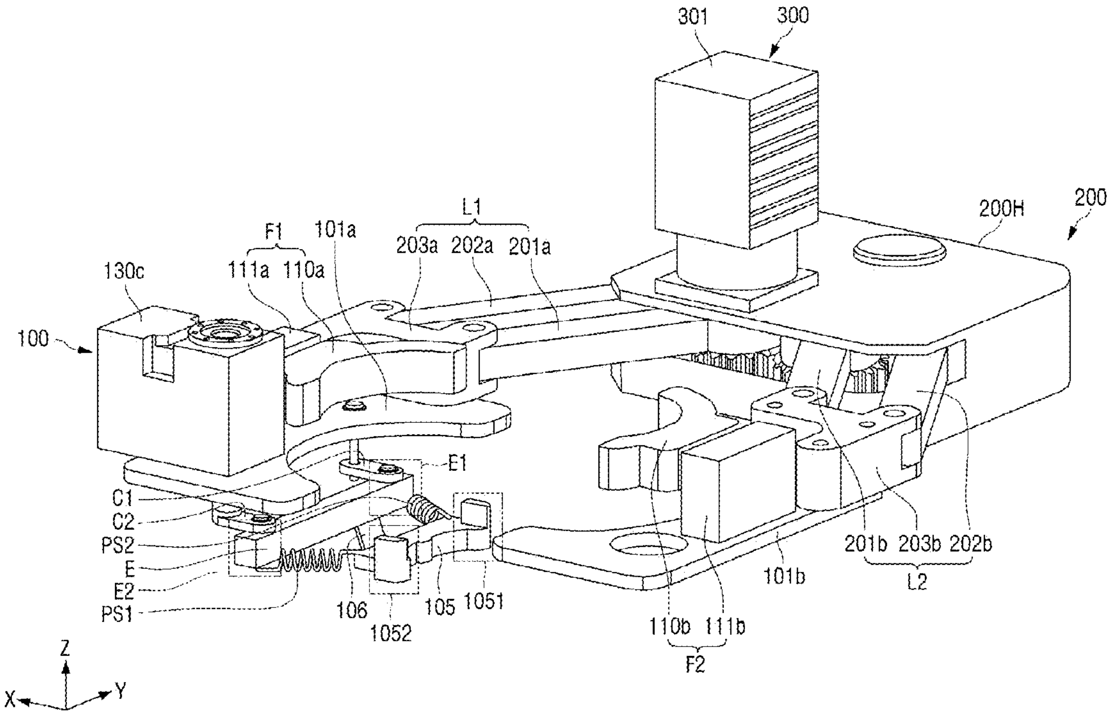
FIG. 11 is a perspective view of an example of a dispenser fastening device.
Figure 12:
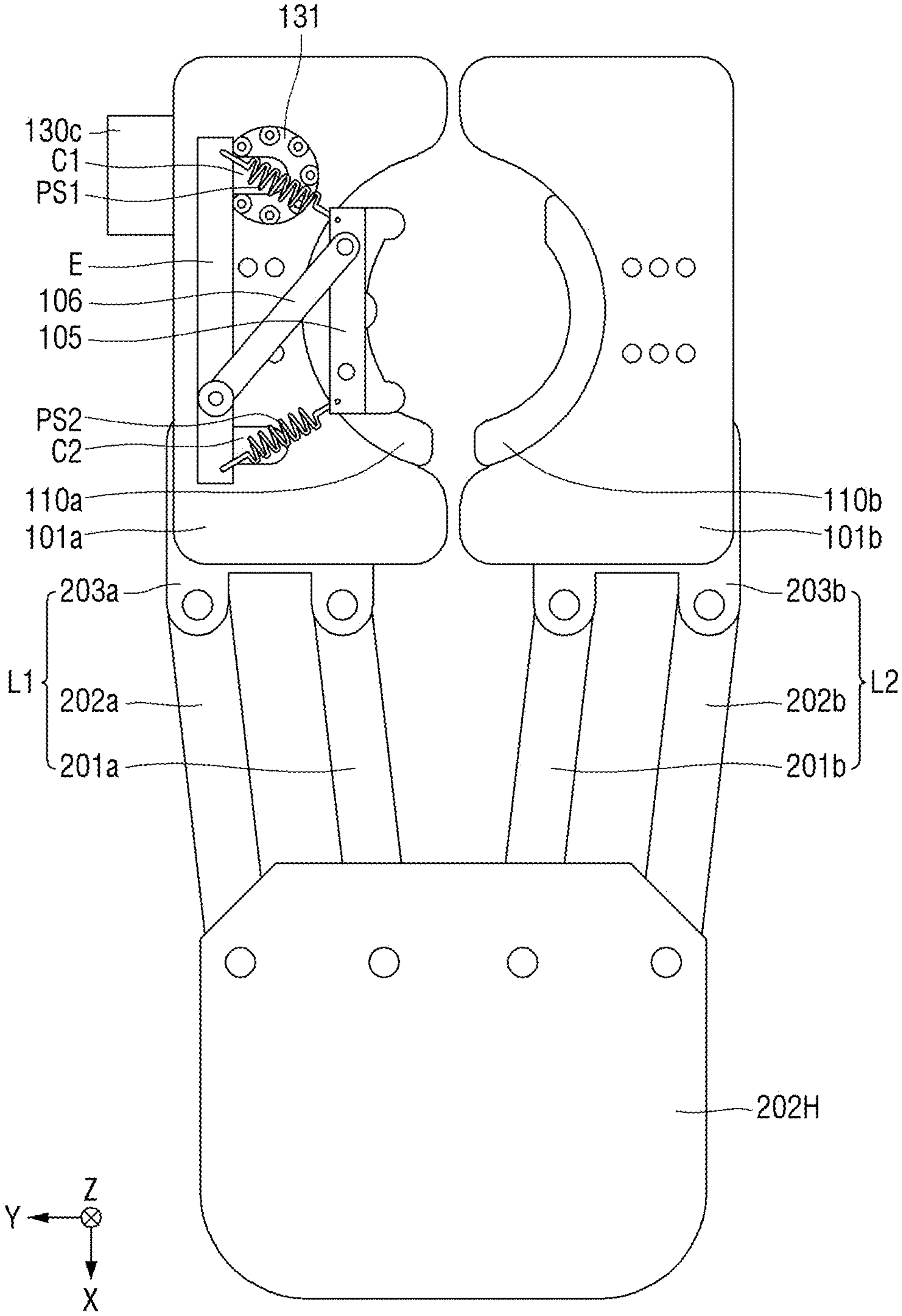
FIG. 12 is a bottom view of the dispenser fastening device of FIG. 11.
Figure 13:
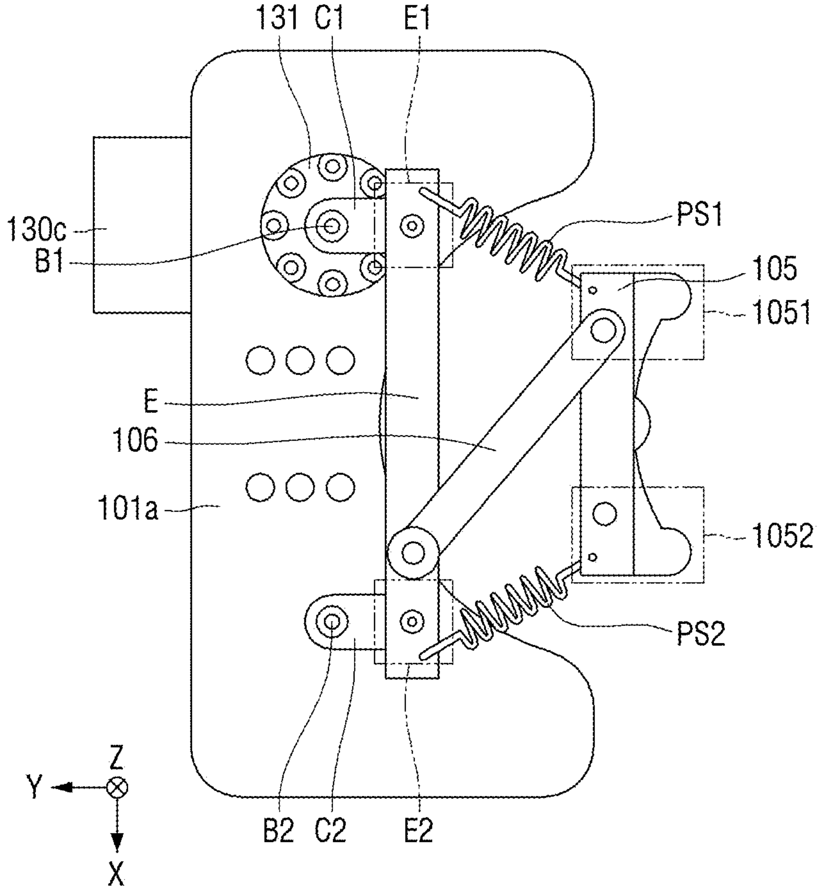
FIG. 13 is a bottom view of the gripping unit of the dispenser fastening device of FIG. 11.

FIG. 11 is a perspective view of an example of a dispenser fastening device. FIG. 12 is a bottom view of the dispenser fastening device of FIG. 11. FIG. 13 is a bottom view of the gripping unit of the dispenser fastening device of FIG. 11. For convenience of explanation, the explanation will focus on points that are different from those described with reference to FIGS. 1 to 6.

Referring to FIGS. 11 to 13, the dispenser fastening device includes a gripping unit 100, a body unit 200, and a power unit 300.

The gripping unit 100 may include a first plate 101*a*, a first finger unit F1, a rotary link driver 130*c*, a rotary link 131, an extension part E, a rotary gripping link 105, an inclined link 106, a first connecting unit C1, a second connecting unit C2, a first horizontal spring PS1, a second horizontal spring PS2, a second plate 101*b*, and a second finger unit F2.

The rotary link driver 130*c* may be disposed on the first surface 101*a*_US of the first plate 101*a*. The rotary link driver 130*c* may be spaced apart from the first finger base 111*a* in the first direction X.

The rotary link 131 may be operated by the rotary link driver 130*c*. The rotary link driver 130*c* may include a power supply. The electrical energy provided by the rotary link driver 130*c* may be converted into a rotational energy of the rotary link 131.

More specifically, the rotary link 131 may rotate about a center B1 of the rotary link 131. The rotary link 131 may rotate counterclockwise or clockwise.

The rotary link 131 may be disposed on the second surface 101*a*_BS of the first plate 101*a*. The rotary link 131 may contact the second surface 101*a*_BS of the first plate 101*a*.

The rotary link 131 may be connected to the rotary link driver 130*c*.

The rotary link 131 may be connected to the first connecting unit C1. More specifically, the lower surface of the rotary link 131 may be connected to the upper surface of the first connecting unit C1.

A portion at which the rotary link 131 and the first connecting unit C1 are connected may be fixed. Even if the rotary link 131 rotates, the portion at which the rotary link 131 and the first connecting unit C1 are connected may not move.

The first connecting unit C1 may be interposed between the extension part E and the rotary link 131. An upper surface of the first connecting unit C1 may be connected to a lower surface of the rotary link 131. A lower surface of the first connecting unit C1 may be connected to an upper surface of the extension part E. A portion at which the first connecting unit C1 and the extension part E are connected may be referred to as a first portion E1.

As the rotary link 131 rotates, the first portion E1 may move along the periphery of the rotary link 131. In other words, the first portion E1 may rotate about the center B1 of the rotary link 131.

The second connecting unit C2 may be interposed between the extension part E and the first plate 101*a*. An upper surface of the second connecting unit C2 may be connected to the second surface 101*a*_BS of the first plate 101*a*. A lower surface of the second connecting unit C2 may be connected to an upper surface of the extension part E. A portion at which the second connecting unit C2 and the extension part E are connected may be referred to as a second portion E2.

A portion at which the first plate 101*a* and the second connecting unit C2 are connected may be fixed. In other words, even if the rotary link 131 rotates, the portion at which the first plate 101*a* and the second connecting unit C2 are connected may not move.

As the rotary link 131 rotates, the second portion E2 may rotate about the rotary center B2.

In some implementations, the first connecting unit C1 and the second connecting unit C2 may be parallel to each other even if the rotary link 131 rotates.

The extension part E may extend in the first direction X to include the first portion E1 and the second portion E2.

In some implementations, when the rotary link 131 rotates, the extension part E may rotate while following an elliptical orbit.

The rotary gripping link 105 may extend in the first direction X.

The rotary gripping link 105 may be in the form of a "U." More specifically, one side wall of the rotary gripping link 105 may be recessed in the second direction Y. Alternatively, the other side wall of the rotary gripping link 105 may not be recessed in the second direction Y.

The rotary gripping link 105 may be spaced apart from the extension part E in the second direction Y.

The rotary gripping link 105 may grip the nut unit 402 or the key code 403.

The extension part E and the rotary gripping link 105 may be connected by a first horizontal spring PS1. The first horizontal spring PS1 may contact the extension part E and the rotary gripping link 105.

One end of the first horizontal spring PS1 may contact the extension part E in the first portion E1.

The other end of the first horizontal spring PS1 may contact the rotary gripping link 105 at the third portion 1051.

The first horizontal spring PS1 may have an elastic force. Therefore, as the rotary link 131 rotates, a distance between the first portion E1 and the third portion 1051 may not be constant.

The extension part E and the rotary gripping link 105 may be connected by a second horizontal spring PS2. The second horizontal spring PS2 may contact the extension part E and the rotary gripping link 105.

One end of the second horizontal spring PS2 may contact the extension part E at the second portion E2.

The other end of the second horizontal spring PS2 may contact the rotary gripping link 105 at a fourth portion 1052.

The second horizontal spring PS2 may have an elastic force. Therefore, as the rotary link 131 rotates, the distance between the second portion E2 and the fourth portion 1052 may not be constant.

The first portion E1 and the second portion E2 may be spaced apart from each other in the first direction X. The third portion 1051 and the fourth portion 1052 may be spaced apart from each other in the first direction X. A straight line that connects an arbitrary point of the first portion E1 and an arbitrary point of the fourth portion 1052 may intersect a straight line that connects an arbitrary point of the second portion E2 and an arbitrary point of the third portion 1051 in terms of a plan view.

The rotary gripping link 105 and the extension part E may be connected by the inclined link 106. The inclined link 106 may contact the extension part E and the rotary gripping link 105.

One end of the inclined link 106 may contact the extension part E at the second portion E2.

The other end of the inclined link 106 may contact the rotary gripping link 105 at a third portion 1051.

Figure 14:
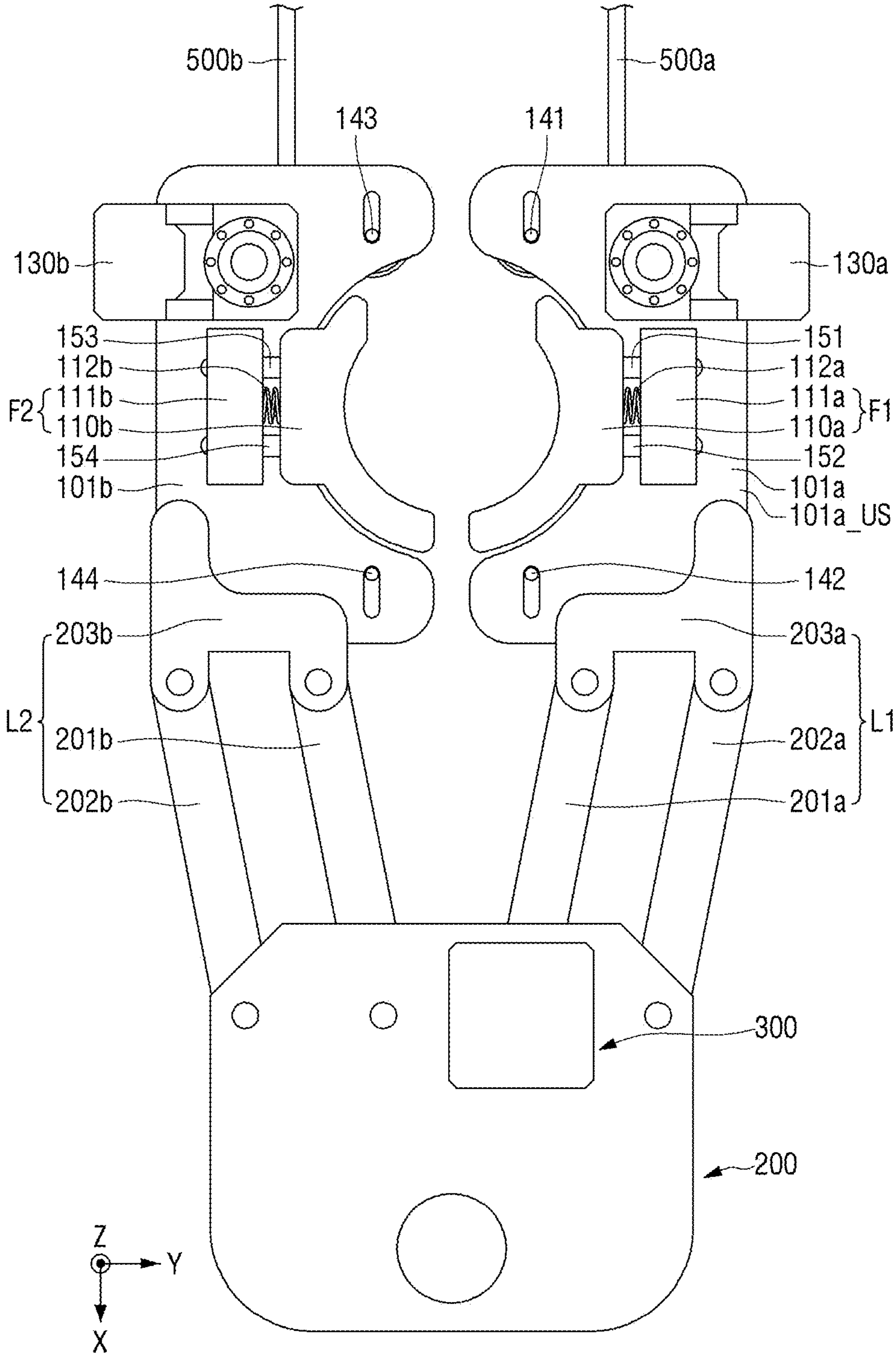
FIG. 14 is a perspective view of an example of a dispenser fastening device.

FIG. 14 is a perspective view of an example of a dispenser fastening device. For convenience of explanation, the explanation will focus on points that are different from those described with reference to FIGS. 1 to 6.

Referring to FIG. 14, the dispenser fastening device includes a gripping unit 100, a body unit 200, a power unit 300, and pins 500*a* and 500*b*.

A first pin 500*a* may extend from the first plate 101*a* in the first direction X. The first pin 500*a* may be connected to the first plate 101*a*.

The first pin 500*a* may have a columnar shape, but other shapes are possible.

The description of the second pin 500*b* may be substantially the same as the description of the first pin 500*a*.

The first pin 500*a* and the second pin 500*b* may be spaced apart from each other in the second direction Y.

The pins 500*a* and 500*b* may perform the function of fastening the dispenser 400.

In some implementations, the pins 500*a* and 500*b* may open and close the lid of a chemical container.

In some implementations, the pins 500*a* and 500*b* may pick up a general article. Unlike the dispenser 400, the term "general article" refers to one that does not require rotation to open and close.

In some implementations, the pins 500*a* and 500*b* may place a general article.

FIGS. 15 to 22 are diagrams showing a procedure in which the dispenser fastening device rotates the nut unit 402.

Figure 15:
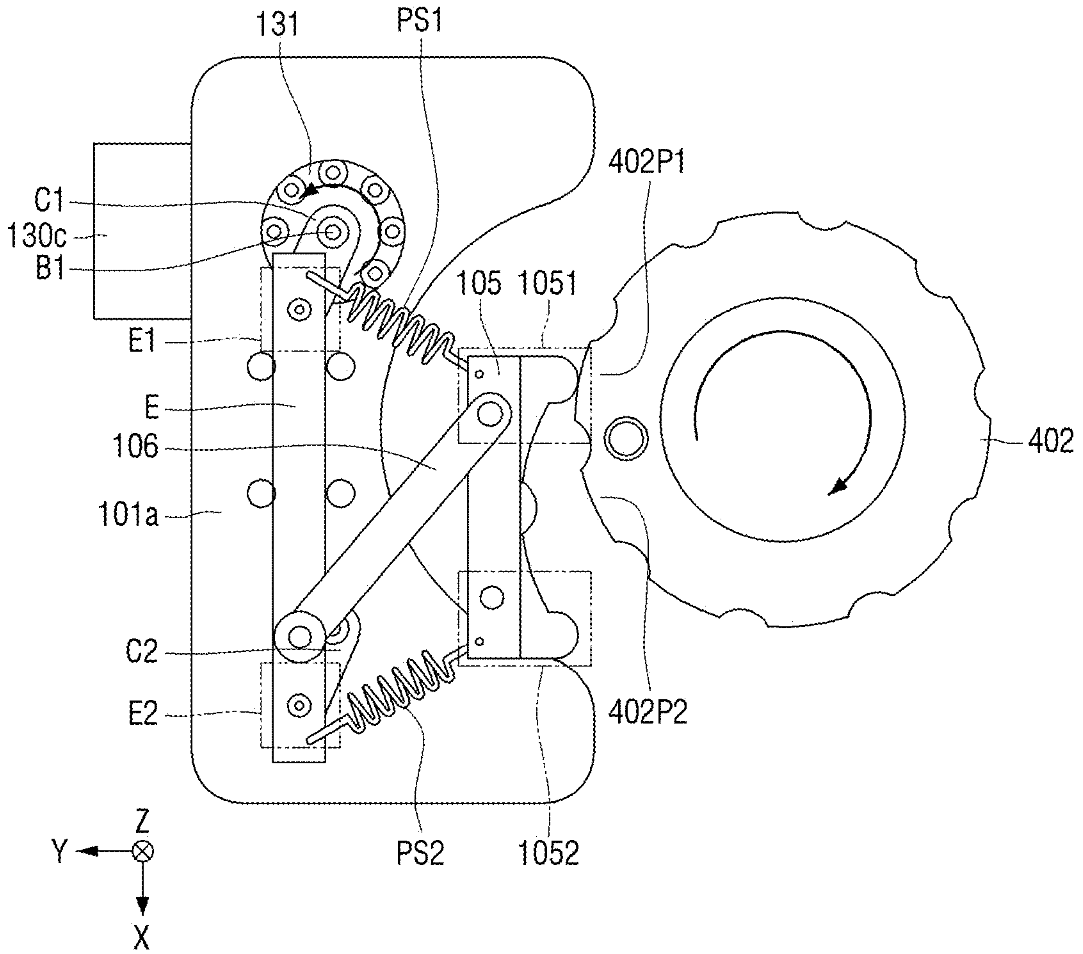
FIGS. 15 to 22 are diagrams showing an example of a procedure in which the dispenser fastening device rotates the nut unit.

Referring to FIG. 15, the rotary gripping link 105, the inclined link 106, the extension part E, the first spring 112*a*, the second spring 112*b*, and the rotary link 131 are provided.

A part of the rotary gripping link 105 of the third portion 1051 may contact a first nut protrusion 402P1.

The rotary link 131 may then rotate counterclockwise.

Figure 16:
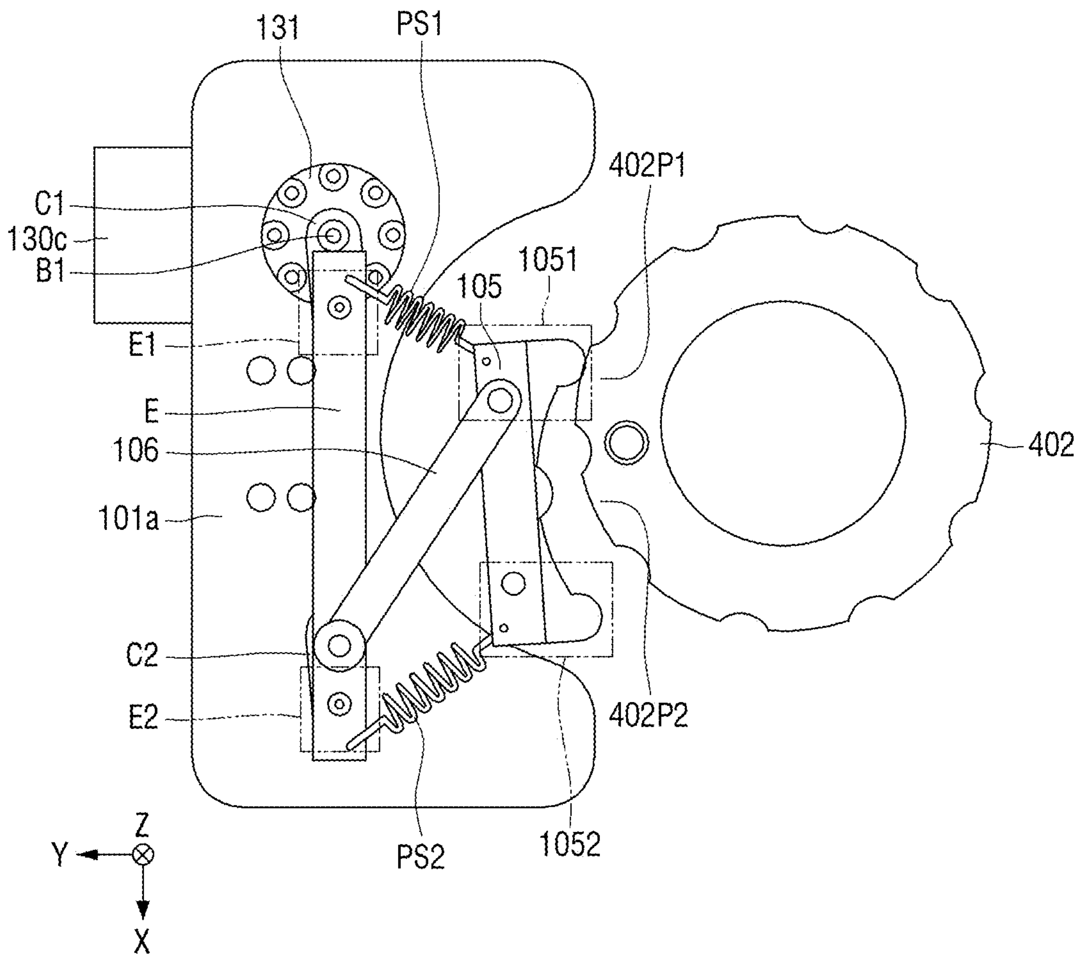

Referring to FIG. 16, the first portion E1 and the second portion E2 may move toward the nut unit 402. As the first portion E1 and the second portion E2 move toward the nut unit 402, a distance between the first portion E1 and the third portion 1051 and a distance between the second portion E2 and the fourth portion 1052 may decrease.

Subsequently, the first horizontal spring PS1 and the second horizontal spring PS2 may be compressed.

Thereafter, the rotary link 131 may further rotate counterclockwise.

Figure 17:
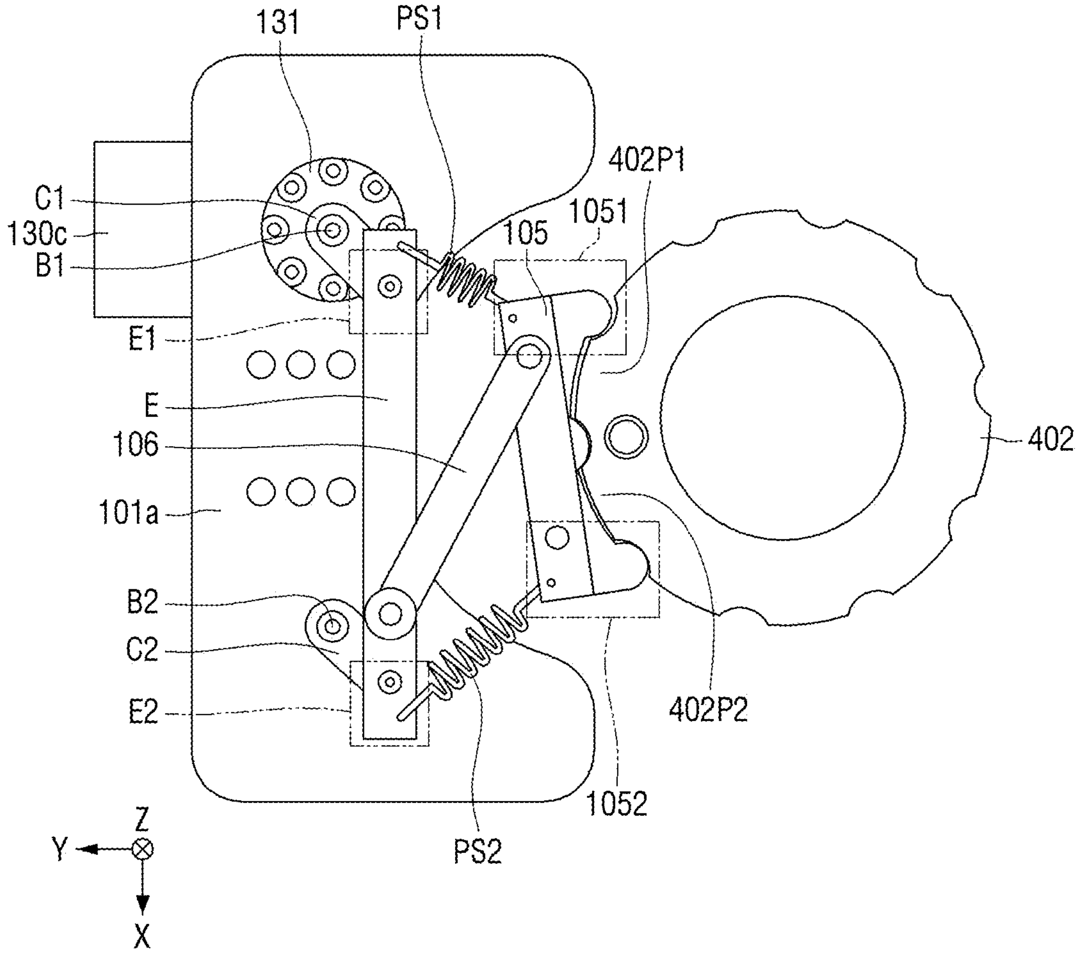

Referring to FIG. 17, the first portion E1 and the second portion E2 may further move toward the nut unit 402. As the first portion E1 and the second portion E2 move toward the nut unit 402, the second nut protrusion 402P2 may completely contact the rotary gripping link 105. Meanwhile, the first nut protrusion 402P1 may partially contact the rotary gripping link 105.

The distance between the first portion E1 and the third portion 1051 may decrease. Therefore, the first horizontal spring PS1 may be further compressed.

The distance between the second portion E2 and the fourth portion 1052 may increase. Therefore, the second horizontal spring PS2 may be pulled.

Thereafter, the rotary link 131 may further rotate counterclockwise.

Figure 18:
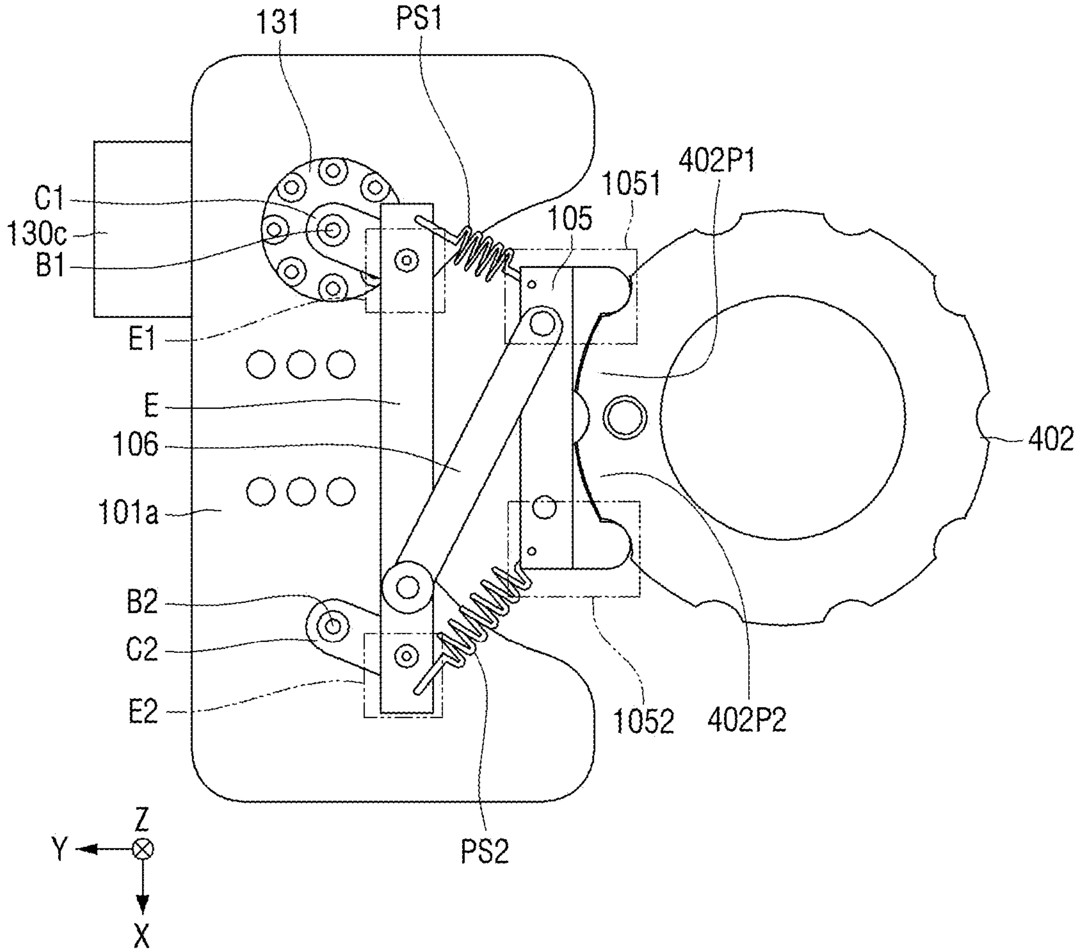

Referring to FIG. 18, the nut unit 402 may rotate clockwise.

The first nut protrusion 402P1 and a second nut protrusion 402P2 may then completely contact the rotary gripping link 105.

Thereafter, the rotary link 131 may further rotate counterclockwise.

Figure 19:
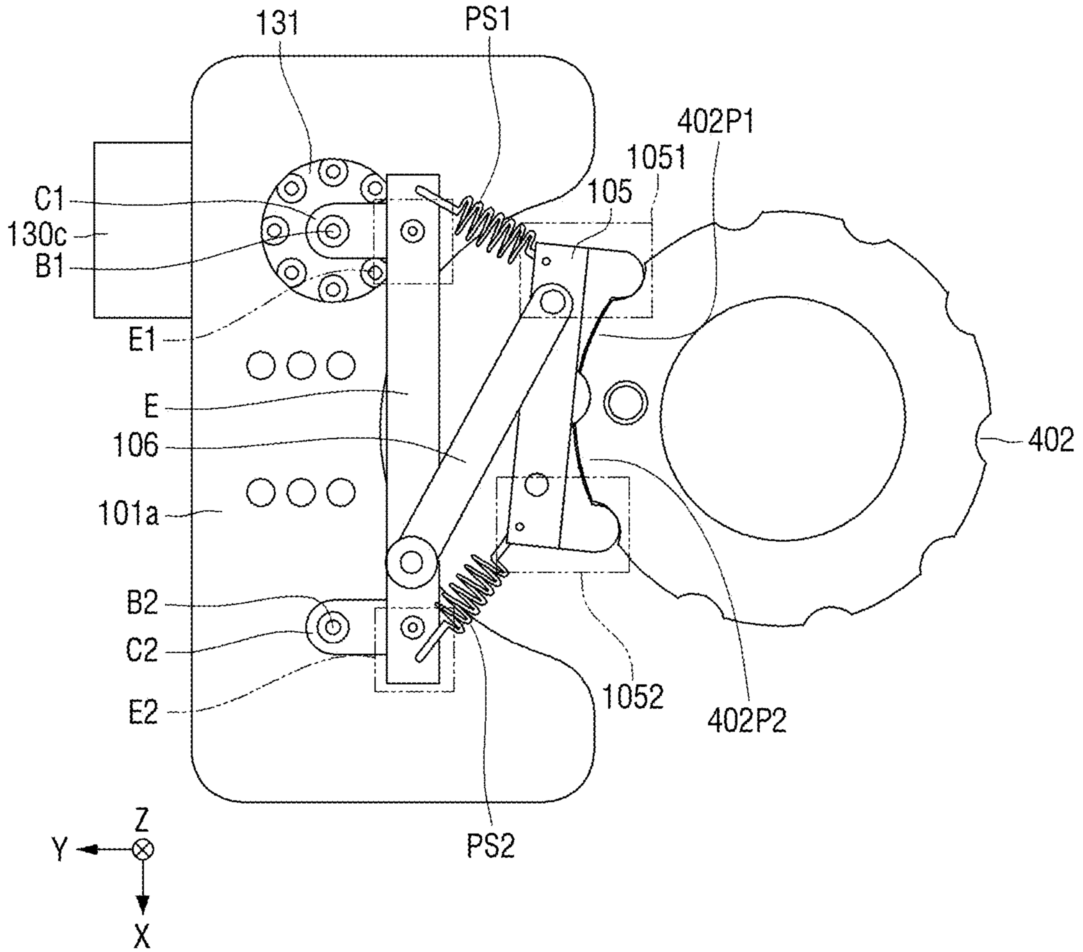

Referring to FIG. 19, the nut unit 402 may further rotate clockwise with the nut unit 402 completely contacting the first nut protrusion 402P1 and the second nut protrusion 402P2. Thereafter, the rotary link 131 may further rotate counterclockwise.

Figure 20:
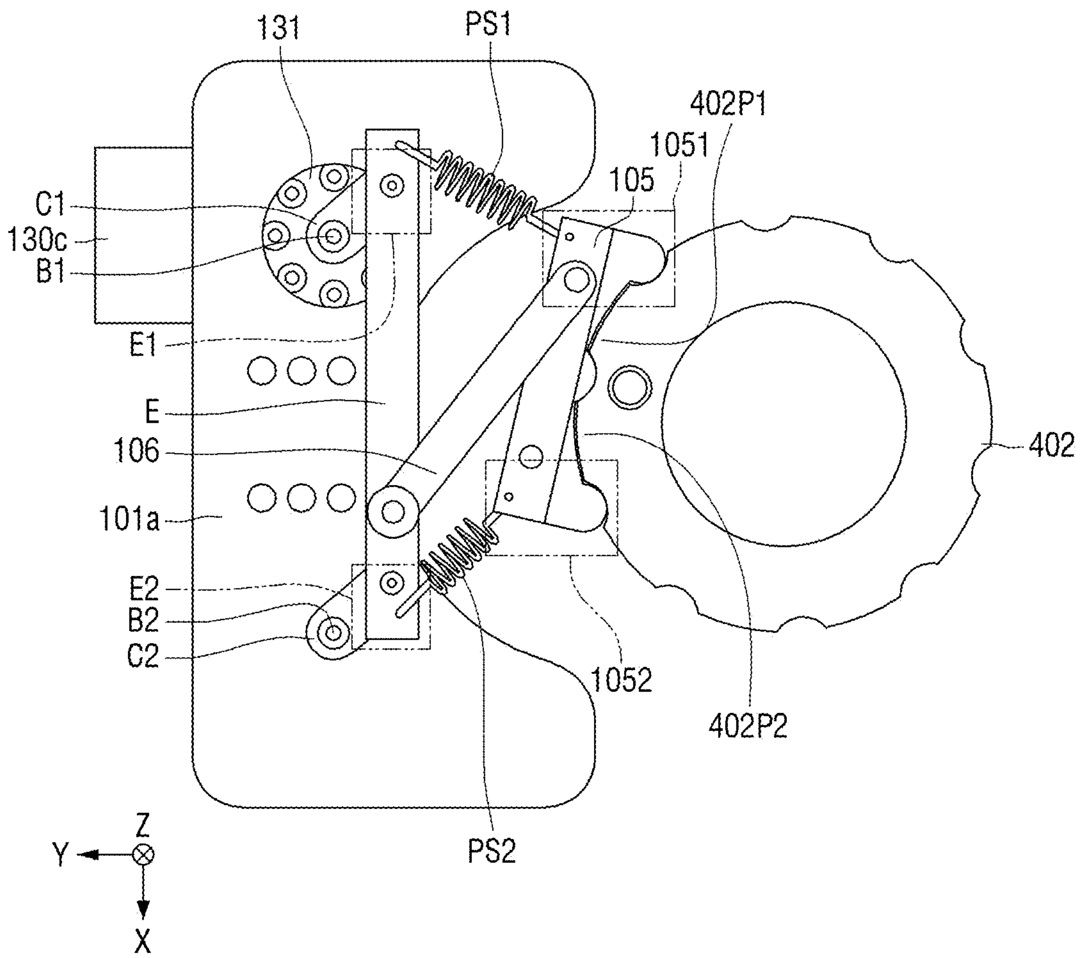

Referring to FIG. 20, the distance between the first portion E1 and the third portion 1051 may increase. Therefore, the first horizontal spring PS1 may be pulled.

Thereafter, the rotary link 131 may further rotate counterclockwise.

Figure 21:
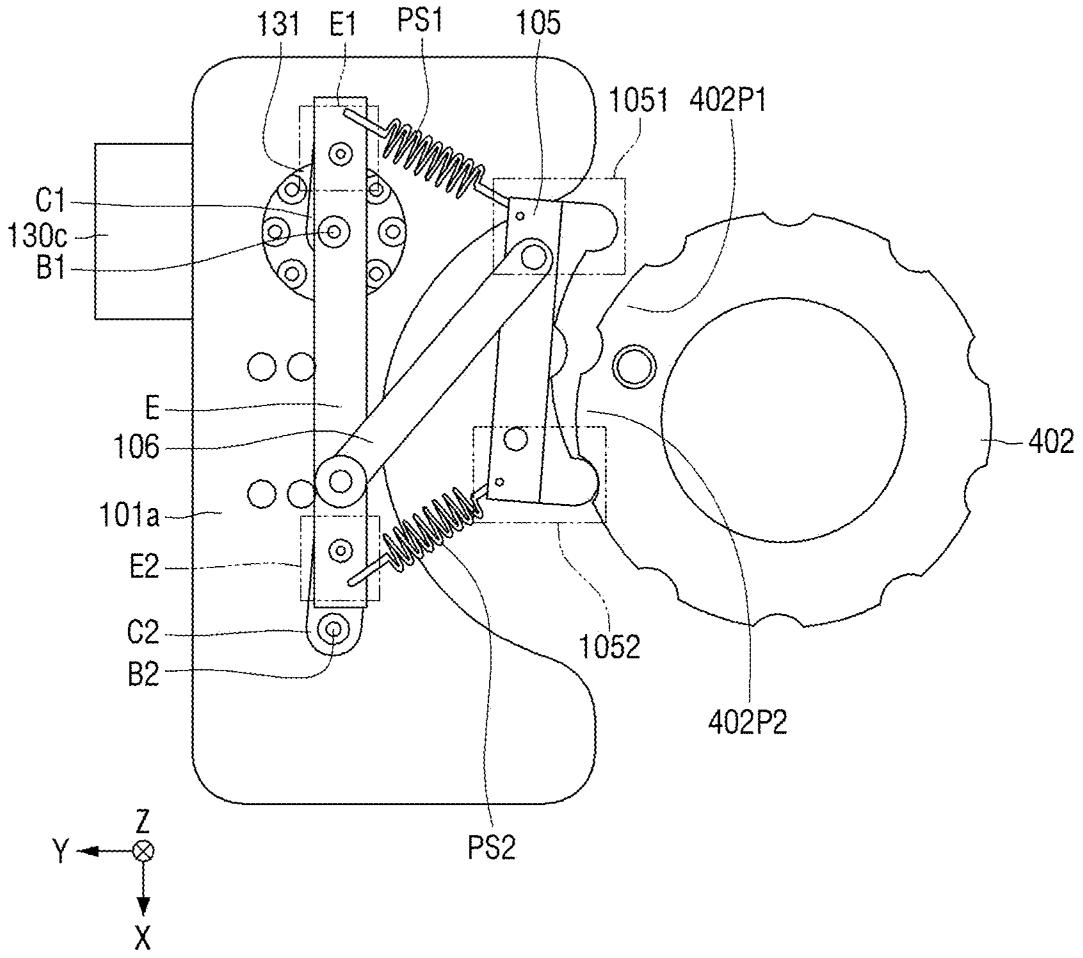

Referring to FIG. 21, the third portion 1051 may be spaced apart from the nut unit 402. In other words, the first nut protrusion 402P1 may not contact the rotary gripping link 105.

A part of the second nut protrusion 402P2 may contact the rotary gripping link 105. Thereafter, the rotary link 131 may further rotate counterclockwise.

Figure 22:
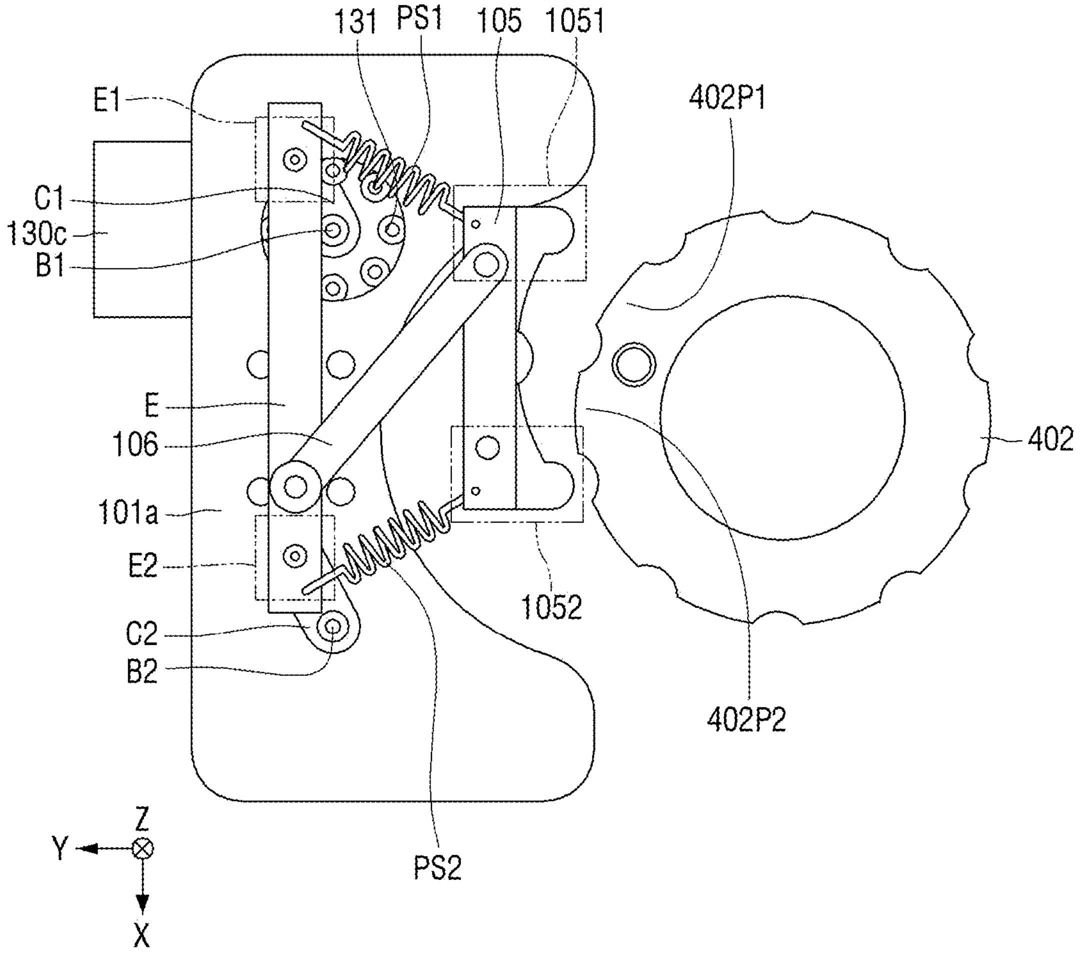

Referring to FIG. 22, the fourth portion 1052 may be spaced apart from the nut unit 402. In other words, the second nut protrusion 402P2 may not contact the rotary gripping link 105.

Subsequently, the nut unit 402 may be rotated clockwise by repeating the procedures of FIGS. 15 to 22.

Figure 23:
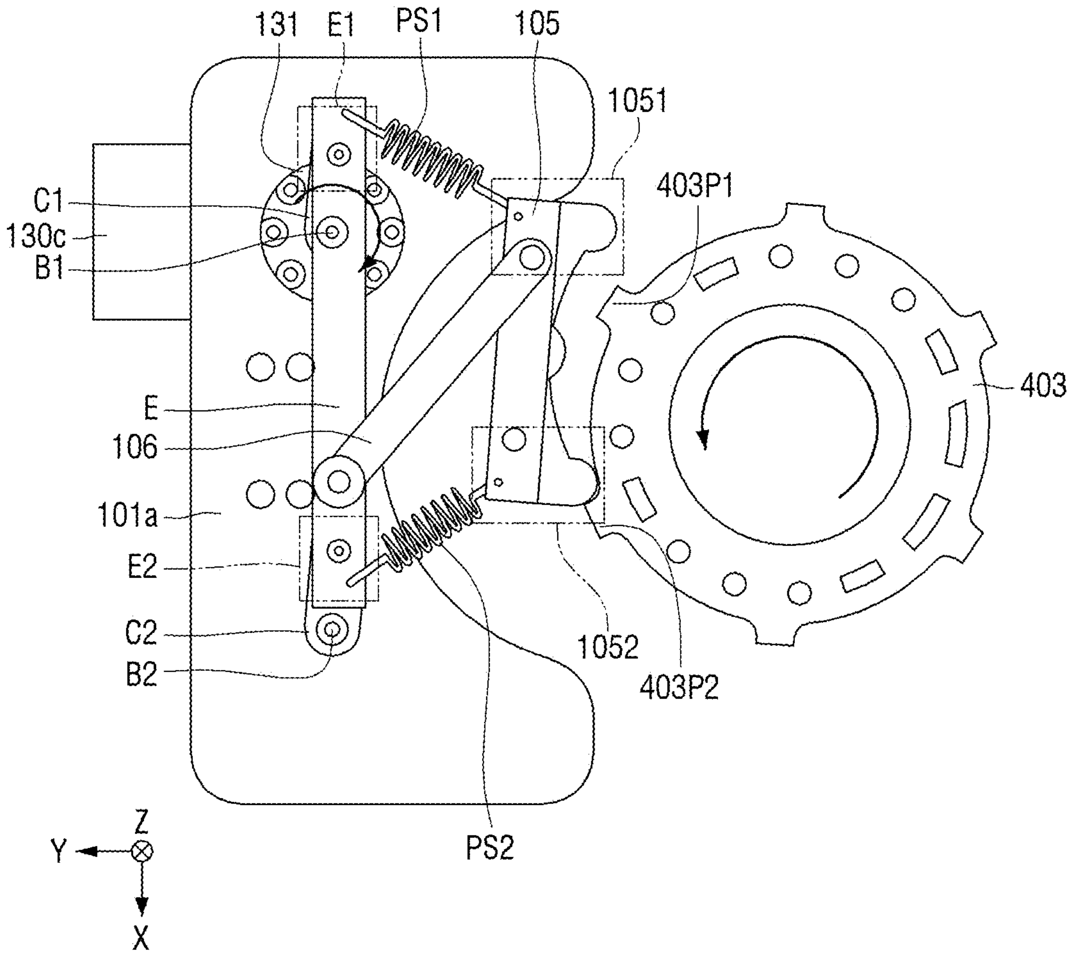
FIGS. 23, 24, and 25 are diagrams showing an example of a procedure in which the dispenser fastening device rotates the key code.
Figure 24:
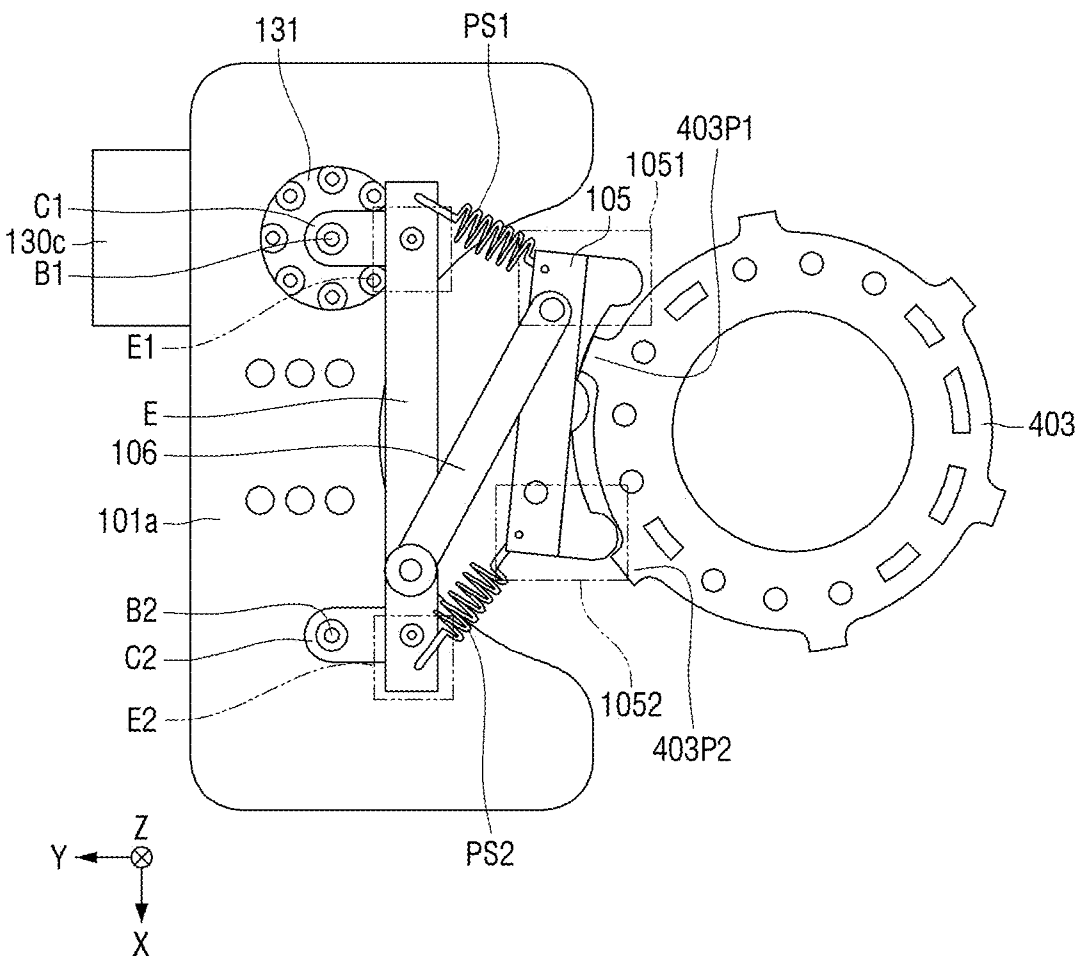
Figure 25:
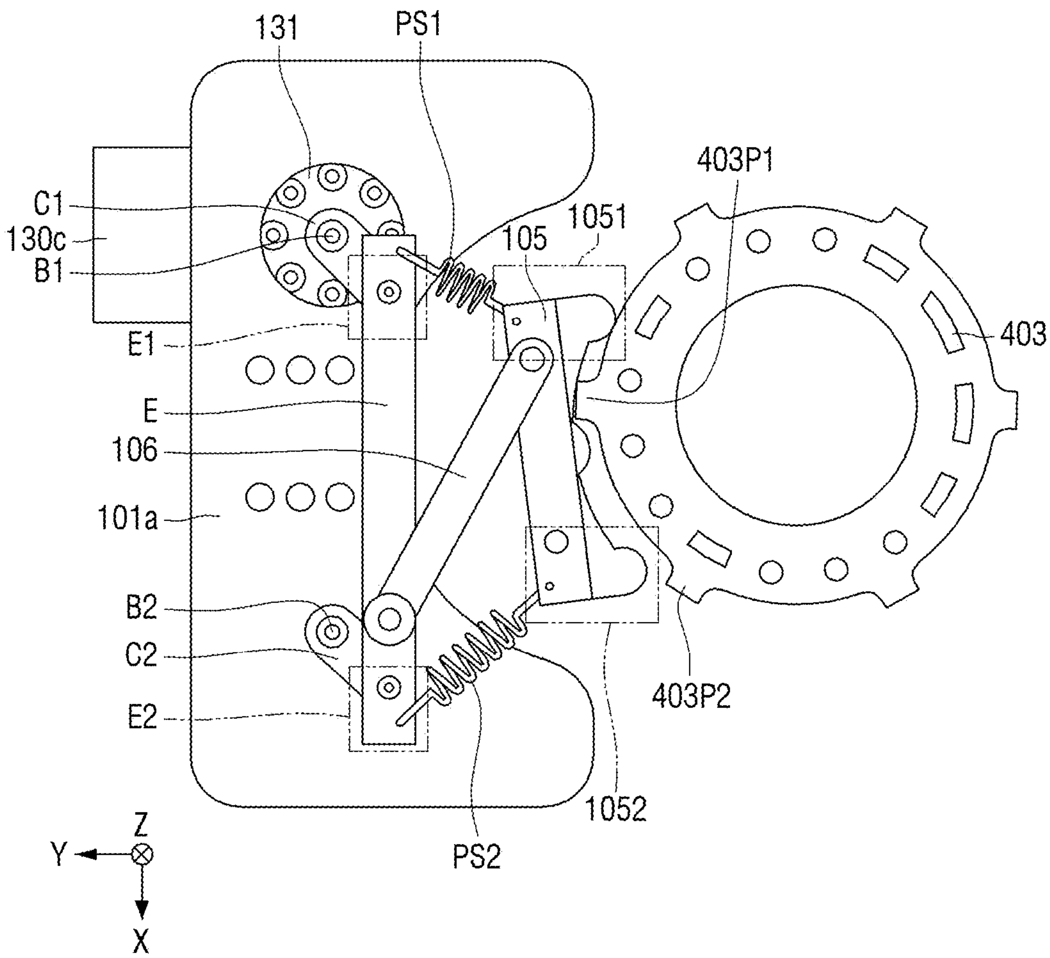

FIGS. 23 to 25 are diagrams showing a procedure in which the dispenser fastening device rotates the key code.

Referring to FIG. 23, the rotary gripping link 105, the inclined link 106, the extension part E, the first spring 112*a*, the second spring 112*b*, and the rotary link 131 are provided.

A part of the rotary gripping link 105 of the fourth portion 1052 may contact a second key code protrusion 403P2.

Subsequently, the rotary link 131 may rotate clockwise.

Referring to FIG. 24, the first portion E1 and the second portion E2 may move toward the key code 403. As the first portion E1 and the second portion E2 move toward the key code 403, the distance between the first portion E1 and the third portion 1051, and the distance between the second portion E2 and the fourth portion 1052 may decrease.

The first key code protrusion 403P1 and the second key code protrusion 403P2 may then contact the rotary gripping link 105.

Subsequently, the first horizontal spring PS1 and the second horizontal spring PS2 may be compressed.

Subsequently, the rotary link 131 may rotate clockwise.

Referring to FIG. 25, the distance between the second portion E2 and the fourth portion 1052 may increase. Therefore, the second horizontal spring PS2 may be pulled.

The fourth portion 1052 may then be spaced apart from the key code 403. In other words, the second key code protrusion 403P2 may not contact the rotary gripping link 105.

A part of the first key code protrusion 403P1 may contact the rotary gripping link 105.

The key code 403 may then be rotated counterclockwise by repeating the procedures of FIGS. 23 to 25.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

In concluding the detailed description, those skilled in the art will appreciate that many variations and modifications may be made to the preferred embodiments without substantially departing from the principles of the present inventive concept. Therefore, the disclosed preferred embodiments of the invention are used in a generic and descriptive sense only and not for purposes of limitation.

What is claimed is:

1. A dispenser fastening device comprising:

a columnar housing;

a link unit that is connected to the housing and extends in a first direction;

a plate that is connected to the link unit, a side wall of the plate having a shape recessed in a second direction intersecting the first direction;

a finger tip that is spaced apart from the plate in a third direction intersecting the first direction and the second direction, a side wall of the finger tip having a shape recessed in the second direction;

a finger base that connects the plate and the finger tip and is installed on a first surface of the plate;

a first adjusting pulley, a second adjusting pulley, and a driving pulley that are provided on a second surface opposite to the first surface of the plate in the third direction; and a belt that surrounds the first adjusting pulley, the second adjusting pulley, and the driving pulley, wherein a center of the first adjusting pulley, a center of the second adjusting pulley, and a center of the driving pulley are arranged to form a triangle shape.

2. The dispenser fastening device of claim 1, wherein the first adjusting pulley and the second adjusting pulley are configured to move on the second surface.

3. The dispenser fastening device of claim 2, wherein movement of the first adjusting pulley and the second adjusting pulley adjusts tension of the belt.

4. The dispenser fastening device of claim 1, further comprising a pulley driver that is installed on the first surface and connected to the driving pulley.

5. The dispenser fastening device of claim 4, wherein the pulley driver is configured to rotate the driving pulley about the center of the driving pulley.

6. The dispenser fastening device of claim 5, wherein the belt is configured to, based on rotation of the driving pulley, move along peripheries of the first adjusting pulley, the second adjusting pulley, and the driving pulley.

* * * * *